US007836086B2

(12) United States Patent
Gregory et al.

(10) Patent No.: US 7,836,086 B2
(45) Date of Patent: Nov. 16, 2010

(54) LAYERING AND REFERENCING OF SCENE DESCRIPTION

(75) Inventors: Eric Gregory, Larkspur, CA (US); Mike Ferris, Oakland, CA (US); Robert Jensen, Berkeley, CA (US); Oren Jacob, Piedmont, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 11/738,953

(22) Filed: Apr. 23, 2007

(65) Prior Publication Data

US 2007/0294270 A1      Dec. 20, 2007

Related U.S. Application Data

(60) Provisional application No. 60/812,196, filed on Jun. 9, 2006, provisional application No. 60/867,681, filed on Nov. 29, 2006.

(51) Int. Cl.
*G06F 7/00* (2006.01)
*G06F 17/30* (2006.01)

(52) U.S. Cl. ..................................... 707/793
(58) Field of Classification Search .................. None
See application file for complete search history.

(56) References Cited

U.S. PATENT DOCUMENTS 5,680,619 A * 10/1997 Gudmundson et al. ...... 717/108

OTHER PUBLICATIONS

Muniswamy-Reddy et al., "A Versatile and User-Oriented Versioning File System", Proceedings of the Third USENIX Conference on File and Storage Technologies, 2004, USENIX.*
"International Search Report PCT/US07/70751", Jul. 2, 2008.

* cited by examiner

*Primary Examiner*—Neveen Abel Jalil
*Assistant Examiner*—Michael J Hicks
(74) *Attorney, Agent, or Firm*—Law Office of Jonathan Hollander PC

(57) ABSTRACT

A unified mechanism of scene description includes layering and cross-referencing relationships. The scene description specifies components using one or more layers. A layer includes an opinion of value for one or more attributes of one or more components. A layer can be sparsely populated with opinions of attribute values for only portions of components' attributes. Layers express opinions of value for an attribute using the semantic structure associated with the attribute. The scene description organizes layers in a layer hierarchy, which determines a layer stacking order. The layer stacking order specifies the compositing of opinions of attribute values to determine the complete authored state of the component. The layer stacking order enables attributes of components to be selectively overridden without disturbing other attribute values. Cross-referencing relationships enable encapsulation and reuse of components. Cross-referencing relationships can encapsulate components defined by one or more layers.

56 Claims, 15 Drawing Sheets

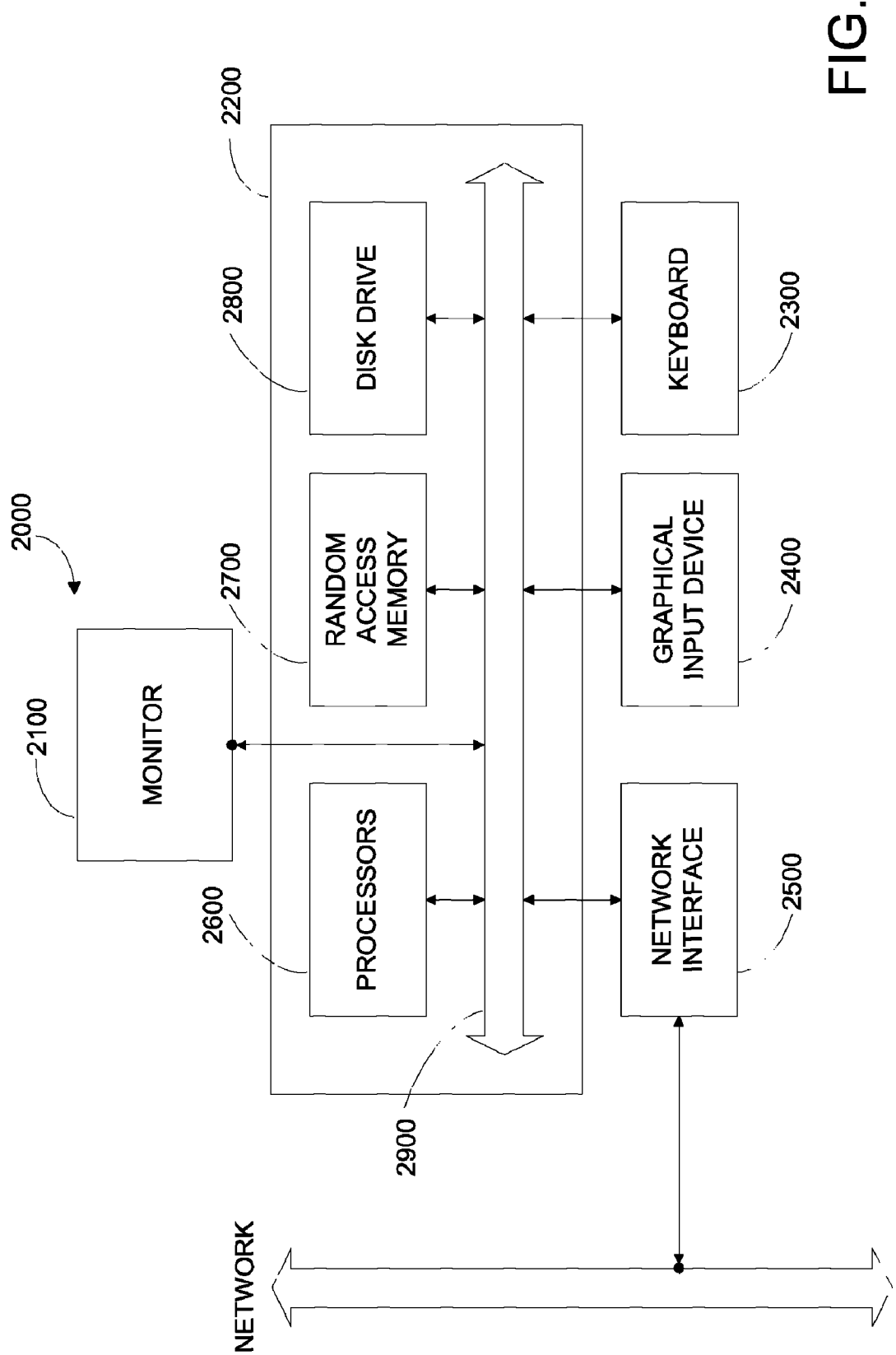

LAYERING AND REFERENCING OF SCENE DESCRIPTION

CROSS-REFERENCES TO RELATED APPLICATIONS

This application claims priority to U.S. Provisional Patent Applications Nos. 60/812,196, filed Jun. 9, 2006, and 60/867,681, filed Nov. 29, 2006, which are incorporated by reference herein for all purposes.

BACKGROUND OF THE INVENTION

The present invention relates to the field of computer graphics, and in particular to methods and apparatus for creating, modifying, and using components to create computer graphics productions. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

Computer graphics images, animations, and other productions involving computer graphics, such as interactive entertainment software, are created from a number of different components. Generally, components include any data and instructions used to create products and applications that include computer graphics. Components can include three-dimensional models of geometry; texture maps, other arrays of data, lighting, and shading programs used to determine the visual appearance of models; and animation data and deformer functions used to specify changes and motion over time. One or more components are typically stored as a digital asset. A digital asset can be a file, database table, executable program or script, or any other type of persistent data store.

Components typically include one or more attributes containing data associated with the component. Attributes can specify any static or varying property or behavior of a component. For example, a component may be a model of a sphere. Attributes of this example component could describe properties such as the radius of the sphere and the location of the center of the sphere. Changing the value of this example component's radius attribute will change the radius of the sphere. Different types of components may include different numbers and types of attributes. The structure, arrangement, and behaviors associated with the set of attributes of a component is referred to as the semantic structure of the component. Different components may have different semantic structures, based on the type of component and its intended use.

Components can include one or more relationships that associate the component to one or more other components. Components may be related together in a hierarchy for ease of use or to specify functionality. For example, a model of a character and a model of the character's hat may be associated together for ease of use. In another example, a set of coordinate transformations may be associated together in a specific order to define a sequence for applying transformations to models. The associations, communications, and/or dependencies between two or more components may be specified by the relationships of these components.

Components are typically combined during rendering to produce an animated sequence. For example, geometric models, shading programs and data, lighting, animation data, and deformers all need to be combined correctly to produce a rendered image or scene. The associations or relationships between components can specify how the components should be combined to create a rendered image or scene.

Additionally, due to dependencies and other relationships between components, some workflow activities that create and/or modify components may need to be performed in a specific order. The activities that create and modify digital assets and their components are sometimes collectively referred to as a digital production pipeline.

Digital production pipelines include modeling, shading, articulation, animation, simulation, layout, lighting, and rendering. Modeling is the creation of the three-dimensional geometry of characters, sets, props, and other objects. Shading is the specification of optical attributes of the surface and interior of objects. Articulation is the specification of joints and other moveable elements of objects. Animation specifies the motion of objects over time in one or more scenes, often with reference to the objects' articulations. Simulation specifies the motion, appearance, and/or behavior of objects. Layout specifies the arrangement of objects and cameras in one or more scenes. Lighting defines the location and other attributes of light in one or more scenes. Rendering produces images or animation from the components.

For large digital productions, such as in an animation or interactive digital production studio, it is often necessary for multiple people to be working on different activities of the digital production pipeline at the same time. Often, different people will be working on the same or related components at the same time. Additionally, some components may be created out of order. As a result, mistakes are common and often lead to conflicts within components and between related components.

Furthermore, components are often reused for a number of different purposes. First, an existing component can be modified for a particular context. For example, variations of a character model can be created with different clothing. Second, new components can be created based on previous components. The new components can then be modified as needed. For example, a new character model can be based on a previously created base model. The new character model can be modified from the base model to implement attributes unique to the new character model.

The reuse of components is not limited to models as described in the above examples. The reuse of components and variations thereof can be applied to all types of components and to any activities of the digital production pipeline. For example, variations of layout, camera, lighting, shading, articulation, animation, and/or simulation components can be used to create and evaluate different creative interpretations of a scene.

Prior digital production pipelines limit component reuse and user collaboration. Version control is one prior technique for collaboration in a digital production pipeline. Version control maintains a strictly linear pipeline workflow. As digital assets and their components progress through activities in the digital production pipeline, changes to components replace or overwrite the previous state of the components. Because of this, it is possible to make potentially destructive modifications to any data that was authored at previous stages in the pipeline.

The disadvantage of version control techniques is that the workflow is strictly linear. Modifications of attributes of components are typically destructive to prior work done. It is difficult or impossible to go back to a previous stage of the digital production pipeline and create variations without discarding all of the data created following that previous stage. It is also typically difficult or impossible to return to an earlier point in the workflow to make changes and still have unaffected "downstream" changes apply. Additionally, because write access to digital assets is restricted to a single user at a time, bottlenecks occur when other users must wait until the current user of a digital asset relinquishes ownership.

Change isolation by scope is another prior technique for collaboration in a digital production pipeline. New components can cross-reference and encapsulate previously created components. The new component has a distinct identity from the referenced component. Typically, prior techniques allow only limited modifications to the new component without impacting the original referenced component. The major drawback to this technique is that there is no way to describe a progressive refinement, or incremental modification to an existing component. It only allows for the creation of a new and unique component that is a variation of an existing one.

It is therefore desirable for a system and method to enable collaboration in digital production pipelines. It is further desirable for the system and method to enable scene modification at any point of the production pipeline and in any order without disrupting work upstream or downstream in the pipeline. It is also desirable for the system and method to enable unrestricted and progressive modifications, refinements, and variations of components at any point of the digital production pipeline. It is additionally desirable for the system and method to include a unified system of scene specification and modification that enables any aspects of the scene to be added, removed, or modified at any point of the digital production pipeline.

BRIEF SUMMARY OF THE INVENTION

An embodiment of the invention includes a unified mechanism of scene description that includes layering and cross-referencing relationships. Components are specified using one or more layers. A layer includes an opinion of value for one or more attributes of one or more components. A layer can be sparsely populated with opinions of attribute values specifying all or a portion of the properties and/or relationship targets of one or more components. Opinions of value for an attribute are expressed using the semantic structure associated with the attribute. The scene description organizes layers in a layer hierarchy. The layer hierarchy determines a layer stacking order. The layer stacking order specifies how the opinions of attribute values from two or more layers specifying the properties and/or relationships of a component should be composited to specify the complete state of the component. The layer stacking order enables attribute values of components to be selectively overridden without disturbing other attribute values. Cross-referencing relationships enable encapsulation and reuse of components. Cross-referencing relationships can encapsulate components defined by one or more layers.

In an embodiment, a data structure for representing at least one component includes a first layer specifying a first opinion of value of a first attribute of a component. The first attribute has a first attribute type specifying a first semantic structure. The first opinion of value of the first attribute is expressed in terms of the first semantic structure. A second layer specifies a second opinion of value of the first attribute of the component. The second layer has a relationship with the first layer. The second opinion of value of the first attribute is expressed in terms of the first semantic structure. The relationship between the first layer and the second layer specifies that the second opinion of value of the first attribute of the component overrides the first opinion of value of the first attribute of the component.

In a further embodiment, the first layer further includes a first opinion of value of a second attribute of the component. The second layer does not include an opinion of value of the second attribute of the component. The relationship between the first layer and the second layer specifies that the second attribute of the component should be set to the opinion of value of the second attribute of the component included in the first layer. In an additional embodiment, the second attribute of the component has a second attribute type specifying a second semantic structure different from the first semantic structure.

In another embodiment, the second layer further includes a first opinion of value of a third attribute of the component. The first layer does not include an opinion of value of the third attribute of the component. The relationship between the first layer and the second layer specifies that the third attribute of the component should be set to the opinion of value of the third attribute of the component included in the second layer.

In an embodiment, the first opinion of value of the first attribute of the component is a cross-reference to a component specified by at least one additional layer. In an embodiment, the first attribute of the component specifies whether the component is active.

In an embodiment, the relationship between the first layer and the second layer is part of a hierarchy of layers. In a further embodiment, the hierarchy of layers defines a layer stacking order between the first layer and the second layer.

In an embodiment, the relationship between the first layer and the second layer is a compositing relationship. In a compositing relationship, an opinion of value of any attribute of the second layer overrides an opinion of value of a corresponding attribute of the first layer. Further, an opinion of value of any attribute of the first layer is unaffected by the second layer if the second layer does not include an opinion of value of the corresponding attribute.

In an embodiment, a set of layers including at least the first and second layers are adapted to be composited according to the relationship between at least the first and second layers to form a composite description specifying the complete state of the component. In an embodiment, components can include attributes pertaining to modeling, shading, articulation, animation, layout, lighting, rendering, editing, special effects, and general-purpose spreadsheets and database tables.

BRIEF DESCRIPTION OF THE DRAWINGS

The invention will be described with reference to the drawings, in which:

FIG. 11 illustrates a computer system suitable for implementing an embodiment of the invention.

DETAILED DESCRIPTION OF THE INVENTION

Figure 1:
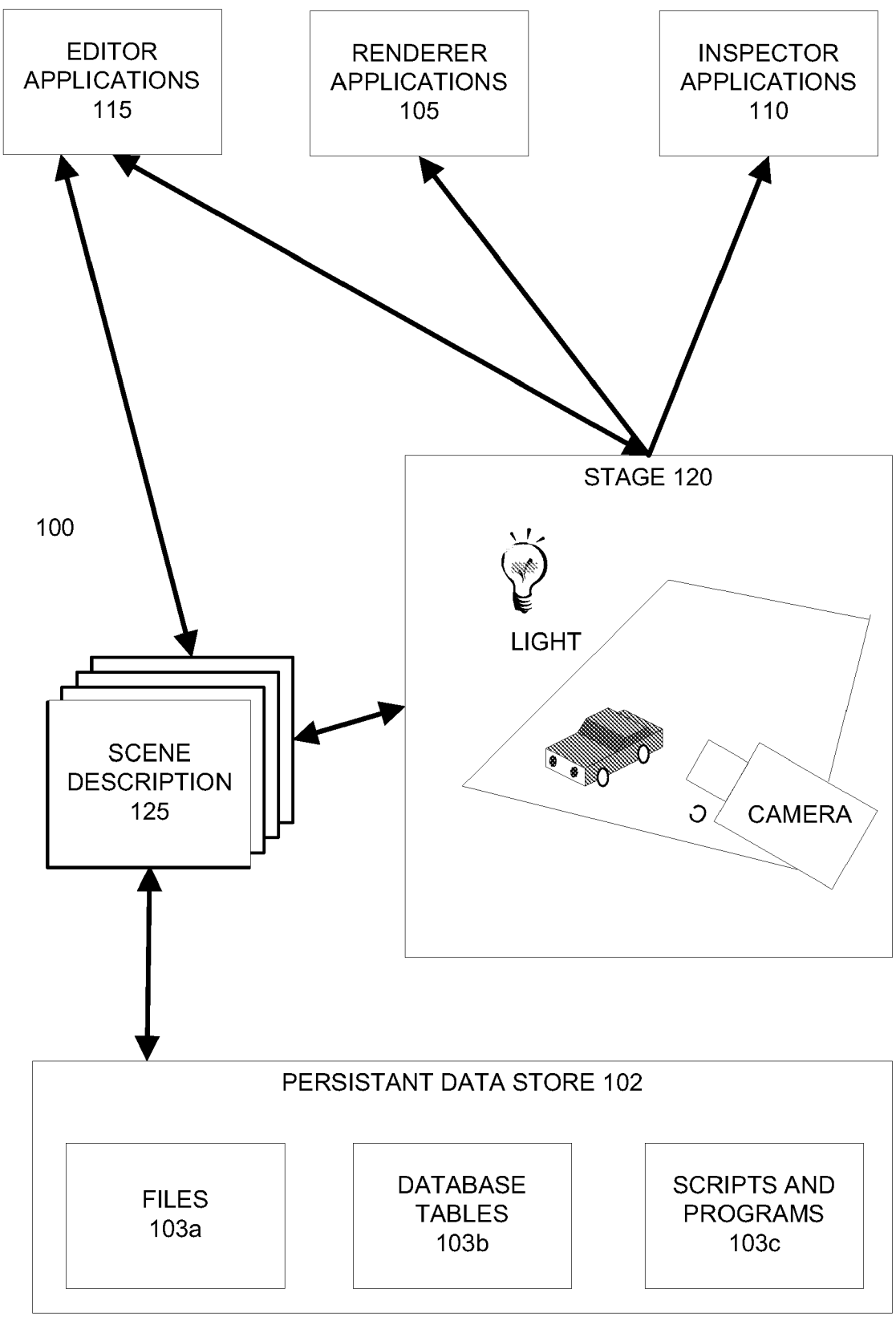
FIG. 1 illustrates a system for creating, modifying, and accessing components in a digital production pipeline according to an embodiment of the invention.

FIG. 1 illustrates a system 100 for creating, modifying, and accessing components in a digital production pipeline according to an embodiment of the invention. A digital production pipeline can include a number of different activities that create, modify, combine, and process digital assets and their components to produce a final product, such as an animated sequence or an interactive software application. For large digital productions, such as in an animation or interactive digital production studio, it is often necessary for multiple people to be working on different activities of the digital production pipeline at the same time. Often, different people will be working on the same or related components at the same time. Although dependencies between components may dictate the order of activities in general, typically some activities may be performed out of order with dependencies between associated components, if any, resolved at a later time.

Often, the digital production pipeline begins with modeling activities. Modeling activities create model components representing the three-dimensional geometry of characters, sets, props, and other objects. Three-dimensional geometry can be defined using three-dimensional modeling software, two- or three-dimensional scans of physical objects, procedural modeling languages, and/or other techniques. The three-dimensional geometry of model components can be represented using any type of mathematical representation, including particles, polygons, higher order surface functions, solid geometry, volumetric data, and subdivision surfaces.

Articulation activities follow the creation of a model component. For model components that will be animated, articulation activities specify how an associated object can be animated. The articulation components associated with a model component can specify the position and operation of joints. Articulation components can also be used to abstract complex motions to relatively simple control parameters, referred to as animation variables. Articulation components may include deformer functions adapted to manipulate a model component based on animation variable values. Deformer functions can perform complex manipulations of a model component in response to animation variables. For example, a single animation variable can define the degree of opening of a character model's mouth. In this example, the value of the animation variable is an input to one or more deformer functions that manipulate several different parts of a character model armature, or skeleton, and/or modify portions of the surface of the character model to create a modified character model having a mouth opened to the desired degree.

Shading activities define optical attributes of model components. Shading activities may include the specification of the color, transparency, reflectivity, and other optical attributes of the surface and/or interior of associated model components. Shading components can include texture map data of any number of dimensions, defined explicitly and/or procedurally; three-dimensional or projected painting attributes; noise data; shadow maps; normal or bump maps; and/or shader programs or procedures.

Animation activities specify the motion or animation of model components. Animation components may specify animation as changes in animation variable values and other attributes of model components over time. The articulation components are used to translate changes in animation variable and other attribute values into changes in the position, orientation, appearance, and other characteristics of the associated model components. Animation activities can specify animation variable values directly, or indirectly using algorithms such as forward or inverse kinematics, keyframes and in-betweening, and motion capture.

Similarly, simulation activities can be used to determine the appearance, animation, and/or behavior of components. Simulation techniques can be used to mimic complex real-world phenomena, such as the appearance and motion of fluids, hair, fur, and cloth. Simulation techniques can also be used for pseudo-realistic or fanciful phenomena. The components output by simulation activities are often similar to components created using animation and shading activities, and therefore can be incorporated and applied in the digital production pipeline in a similar manner.

Layout activities arrange components such as models, articulation, shading, and animation together in one or more scenes or shots. Layout activities can also include the specification of one or more cameras, each representing a desired rendering viewpoint, for each scene. The layout of each scene may be specified by a component incorporating or referencing other components or by a portion of the attribute values of the components of the scene.

Lighting activities specify the location and attributes of one or more light sources in a scene. Light sources are components that specify the amount, direction, and type of light falling on one or more model components in a scene. The location and attributes of light source components can change over time through an association with an animation component.

Rendering activities convert layout components and associated model, articulation, shading, animation, simulation, lighting, and other components into one or more images representing a scene from a desired rendering viewpoint. Rendering activities can use any rendering techniques or combination of techniques known in the art, including rasterization, scanline rendering techniques, image based rendering techniques, global illumination, radiosity, and ray tracing. Rendering can be done at interactive frame rates or offline.

For non-interactive products, the output of the renderer can be composited, edited, mixed with audio, and otherwise processed to create the finished movie. Animated sequences from two or more cameras positioned within a scene or from multiple scenes together can be combined to form a finished sequence. Editing information can be represented in the form of components such as edit decision lists that indicate the location, length, and sequence of animation sequences to be combined. For interactive productions, the finished product can include digital assets containing all the required components, a renderer, and control logic responsive to user input. User input is processed by the control logic to manipulate the state of components. The renderer then processes the components to provide an interactive presentation to the user.

System 100 includes a number of applications for creating, viewing, modifying, and processing digital assets and their components. Examples of these applications include renderer applications 105, inspector applications 110, and editor applications 115. Renderer applications 105 are adapted to process components to create one or more images. Renderer applications 105 can utilize any rendering techniques or combinations of techniques known in the art, including ray casting and ray tracing, scanline rendering, rasterization, and image based rendering. Renderer applications 105 can produce images at interactive frame rates or at substantially slower rates depending upon the rendering technique, the available computing resources, and the desired degree of visual detail. Renderer applications 105 can also edit and combine sequences of animation.

Inspector applications 110 are adapted to present users with the state of one or more components. The state of components can include the values of one or more attributes. Attributes can define all aspects of a component, including whether the component itself is active, or is present, in a scene. Additionally, the state of components can change over time within an animated sequence and at different points in the digital production pipeline. Inspector applications 110 can present state information of components in a number of different formats, including in the form of text, tables, timelines, charts, graphs, images, and renderings from one or more viewpoints.

Editor applications 115 are adapted to create and modify the state of one or more components. Editor applications 115 can utilize interfaces adapted to manipulate data in the form of text, tables, timelines, charts, graphs, images, and renderings from one or more viewpoints to create components and modify their attributes. Additionally, a user can input attribute values directly using any type or combination of input devices well known in the art, including keyboards, mice, and digitizer tablets. Additionally, editor applications 110 can analyze user input to indirectly set or modify one or more attribute values. For example, a user input could be processed by a filtering algorithm in an editor application to modify several attributes simultaneously in varying amounts.

Example applications 105, 110, and 115 can be combined into hybrid applications that perform inspector, editor, and/or renderer functions together. In an embodiment, system 100 includes an application programming interface enabling any additional applications to access and modify components.

Digital production pipeline applications, such as example applications 105, 110, and 115, can store and retrieve components in digital assets, such a files, 103a; database tables, 103b; and scripts and programs, 103c. The digital production pipeline applications can create new digital assets to hold one or more components, modify existing digital assets to add, remove, or modify components, remove unneeded digital assets, and encapsulate one or more digital assets in another digital asset. Digital assets 103a, 103b, and 103c are stored by persistent data store 102, which can be comprised of data storage devices of any type.

In an embodiment, system 100 includes a stage 120. The stage 120 includes an instantiation of the complete state of one or more components for at least one scene. This can include a component such as a model, a light, or a camera; articulation and animation data; a supporting component such as a texture map or a shader; or any combination of components. As discussed below, the stage 120 instantiates the complete state of one or more components for one or more scenes at any point in the digital production pipeline. Components may take on different states, or augment their initial state with additional attributes, at different points of the digital production pipeline. Applications 105, 110, and 115 can create, access, and modify the state of components for one or more scenes via stage 120.

To maintain state information for components for one or more scenes at any arbitrary point of the digital production pipeline, an embodiment of the system 100 represents components as a unified scene description 125. For each component, the unified scene description 125 includes at least one opinion of the value of each of its attributes for one or more scenes, with the exception of any application-supplied or default values. To determine the state of a component for one or more scenes at a given point of the digital production pipeline, the system 100 processes the unified scene description 125 to identify the most appropriate opinions of attribute values for the given point. The system 100 reconstructs or instantiates the component in the stage 120 using the complete set of opinions of attribute values associated with the given point (as well as any application-supplied or default values, if necessary).

Figure 2:
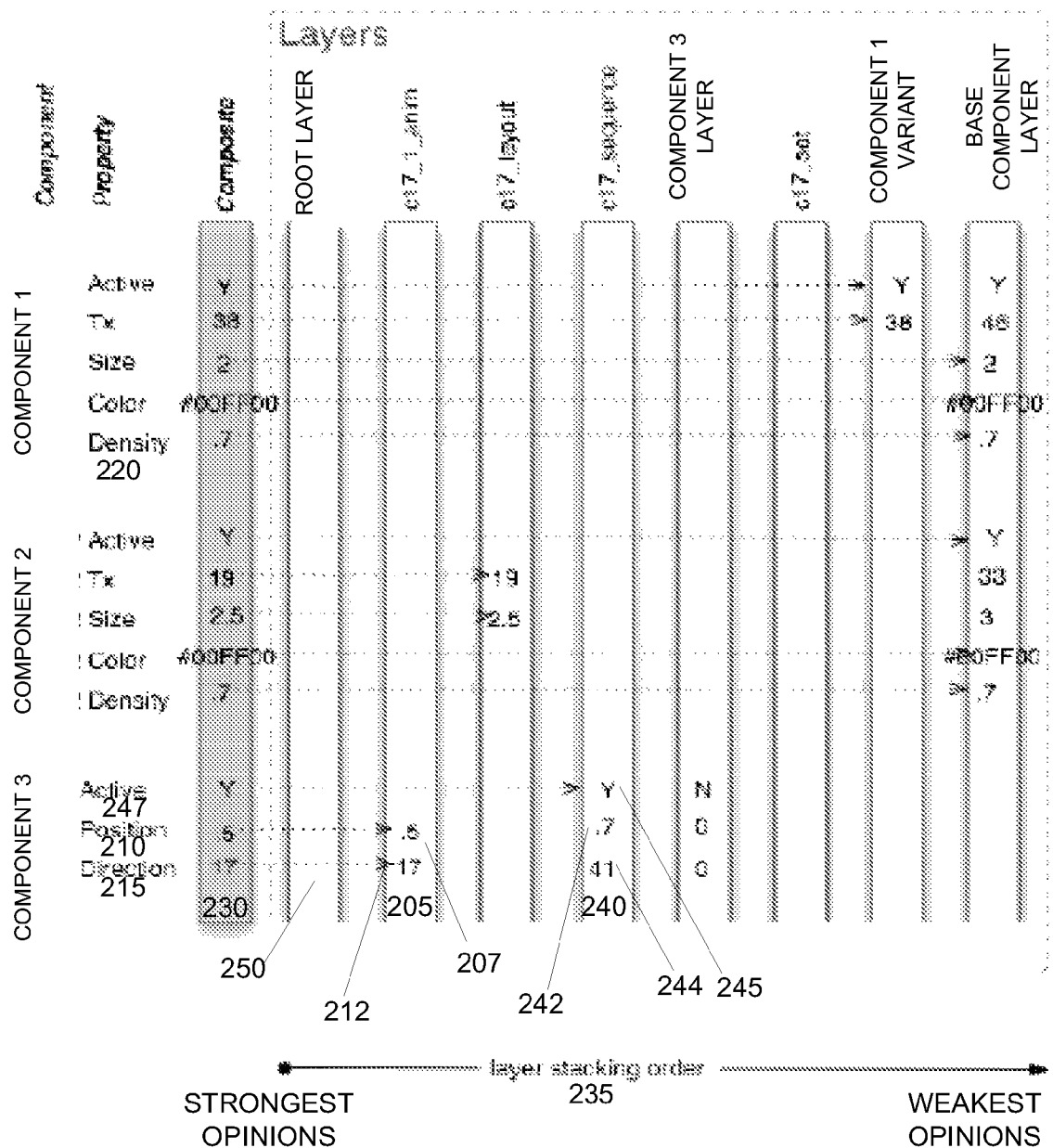
FIG. 2 illustrates a layers data structure specifying attributes of components according to an embodiment of the invention.

FIG. 2 illustrates a layers data structure 200 specifying attributes of components in one or more scenes according to an embodiment of the invention. In an embodiment, a component in one or more scenes is represented using one or more layers of a layer data structure. The layer data structure stores opinions of attribute values for a component. In this embodiment, each non-empty layer is adapted to include an opinion of the value of at least one attribute of at least one component. As discussed in detail below, each layer can override opinions of attribute values from weaker or lower-level layers.

Each layer may be sparsely populated—that is, a layer does not have to include opinions for the value of every attribute of a component. Each layer can specify an opinion of value for a new attribute without having that attribute explicitly declared by a prior layer. A layer can include opinions of value for attributes of multiple components. Additionally, empty layers can be created in early stages of the digital production pipeline as placeholders for opinions of attribute values to be provided at later stages of the digital production pipeline.

In example layer data structure 200, layer 205 includes an opinion 207 that the position attribute 210 of component 3 should be set to a value of 0.5 and an opinion 212 that the direction attribute 215 of component 3 should be set to a value of 17. As can be seen in this example, the opinions of value of other attributes, such as the density attribute 220 of component 1 is undefined in layer 205.

In the above example, attribute values are numerical parameters. However, embodiments of layer data structure 200 allow the specification of any data type for an attribute value, including integers; floating point numbers; characters; strings; Boolean values; geometry data; compound data types such as vectors with two or more dimensions, matrices, structures, arrays, dictionaries, hash tables, elements of edit decision lists; references to one or more components; references to one or more layers; references to elements, tables, or other structures of a database; and references to internal or external functions, scripts, or executable programs.

Layers provide opinions of value for attributes of components in terms of the semantic structure associated with the components. Any arbitrary abstract attribute of a component can be expressed in a layer. Furthermore, one or more layers can provide opinions of value for the attribute of a component in the unique terms or semantic structure defined for that attribute. There is no need to reduce opinions of value of abstract attributes to a common or low-level form, such as pixels or points, to composite the values.

For example, a first layer can specify a model of a character wearing a hat. One attribute of the hat could be its type, such as "sombrero." Another attribute of the hat could be its color, such as "red." A third attribute of a hat could be its material, such as "straw." Thus, from the view of the first layer, the character model should have a red straw sombrero. A second layer that is higher or stronger than the first layer could change the type attribute of the hat from "sombrero" to "top hat." Thus, from the view of the second layer, the character model should have red straw top hat. A third layer that is higher or stronger than the second layer could specify that the color attribute of the hat should be "purple" and the material attribute should be "felt." Thus, from the view of the third layer, the character should have a purple felt top hat. In this example, each layer expresses an opinion of one or more attribute values in terms of the semantics associated with each attribute.

Furthermore, a component may include a cross-reference to another component defined by one or more layers. For example, a Hat component of a character model can be a cross-reference to a specific model of a hat. Thus, when cross-reference is set to a "sombrero" component, the character model includes a model of a sombrero. When the cross-reference is overridden by a layer to a "top hat" component, the character model is changed to include a model of a top hat. Each of these models can be defined by one or more layers, the attributes of which can be wholly or partially or overridden by other layers as described above.

In an embodiment, every activity in the digital production pipeline is associated with one or more layers. Users can create and manipulate layers manually to provide additional control and ease of use for a component. For example, the attributes of different models can be specified in separate layers. In another example, related attribute values for different models in a scene can be specified in the same layer to facilitate easy manipulation. In an embodiment, applications associated with activities can automatically create, access, and modify layers based on context, such as the activity, the type of component, and the action being performed by the user.

The complete authored state of one or more components in one or more scenes at a given point of the digital production pipeline is determined by compositing all of the layers associated with a given point to produce a composite layer 230. The composite layer 230 includes opinions of attribute values for the attributes specified by one or more of the associated layers. The composite layer 230 can also be referred to as a composite scene description.

In an embodiment, a layer stacking order 235 determines the order in which layers are composited. This in turn specifies how attribute values in one layer override corresponding attribute values in other layers. In an embodiment, layers are assigned a strength in absolute or relative terms. For example, a first layer can include a relative strength value indicating that it is stronger than or weaker than one or more other layers. In this embodiment, opinions of attribute values in stronger layers will be at the "top" of the stacking order and will override opinions of attribute values in weaker layers, i.e. layers that are "lower" in the stacking order. The example layer stacking order 235 is a linear order; however, more complicated layer stacking orders with multiple branches can be utilized. In an embodiment, layer stacking orders can be set or modified by digital production pipeline applications, either manually by a user or automatically by applications. In a further embodiment, the strength of layers is defined at least in part with respect to a root layer, such as root layer 250, which is by default the strongest or highest level layer.

In example layer data structure 200, layer 240 includes opinions 242 and 244 of the value of attributes 210 and 215. However, stacking order 235 places layer 205 as stronger than, or ahead of, layer 240. Thus, in the composite layer 230, the opinions of value 207 and 212 of layer 205 for attributes 210 and 215 will override corresponding opinions 242 and 244 in layer 240. However, as layer 205 does not define an opinion of value for attribute 247 of component 3, the opinion 245 in layer 240 will define the value of attribute 247 in the composite layer 230.

FIGS. 3A-3D illustrate a scene description data structure representing the state of a component and layer operations according to an embodiment of the invention. FIG. 3 illustrates a scene description data structure 300 representing the authored state of components in one or more scenes according to an embodiment of the invention. The authored state is the set of attribute values apart from any default or application-provided fallback attribute values for one or more components. The scene description data structure 300 specifies a graph or set of relationships between components as well as layer data structures specifying opinions of attribute values of components for one or more scenes. For a graph of relationships, components and layer data structures are referred to generally as nodes.

In an embodiment, the scene description data structure 300 combines two different aspects: a layer data structure, as described above, and cross-references to components. The layer data structure enables the progressive refinement and incremental modification of components as needed. The cross-references to components enables the encapsulation and reuse of components. Together, this combination enables: scene modification at any point of the digital production pipeline, in any order, without any loss of data in upstream or downstream activities of the digital production pipeline; unrestricted and progressive modification and refinement of components; and a unified system of scene specification and modification that enables any aspects of the scene to be added, removed, reused, or modified at any point of the digital production pipeline.

In an embodiment, scene description data structure 300 specifies the relationships between components and layer data structures, which express opinions of component attribute values, in a hierarchical graph structure. Nodes of scene description data structure 300 may correspond with components, such as data representing geometry, texturing, shading, articulation, animation, simulation, layout, lighting, or rendering, or with layer data structures.

In an embodiment, the hierarchical graph structure includes three different types of relationships between components and layers: namespace relationships, layer relationships, and cross-reference relationships. Namespace relationships establish the namespace or other nomenclature used to identify and organize components. Namespace relationships are used to assign components' identities, to match up components from different layers that should override each other, and to provide the scope of inclusion for references. Alternative embodiments can utilize other attributes, such as globally unique identifiers (GUIDs), to arrange components and layer data structures within the scene description data structure.

Layer relationships specify the relationship between a layer data structure and one or more sublayers. Layer relationships specify the layer stacking order used to composite or combine layers to determine attribute values of components.

Cross-reference relationships provide links to components specified elsewhere. A cross-reference relationship from a first component in a first layer data structure can reference a second component defined in the same layer data structure, a second component in another layer data structure associated with the first layer data structure, or a second component in another layer data structure that is not associated with the first layer data structure. Implementations of cross-reference relationships can be restricted to directly referencing only the root component in another layer data structure (with any child components referenced implicitly using namespace relationships associated with the root component) or alternatively can be unrestricted to allow direct referencing of any arbitrary component in another layer data structure.

In an embodiment, the scene description data structure 300 includes a root layer 305 for the scene. In an embodiment, the relationships of the hierarchical graph between components and layer data structures are specified, at least in part, by root layer 305. Child nodes, such as root component 310 and sublayers hierarchy 312 can be directly associated with the root layer 305.

In an embodiment of the hierarchical graph, each non-empty layer data structure, including the root layer 305, includes at least one root component, such as root component 310. Additional components within the layer data structure are associated as child nodes (or grandchild or other descendant nodes) of the root component. As an example of this embodiment, one or more additional components 315 are associated via namespace relationships 340 as descendant nodes of root component 310.

In an embodiment, the namespace relationships 340 between component nodes in a layer are specified in the form of relationship attributes of components. For example, component 315 can include a parent attribute, which would be set to reference component 310. In another embodiment, a component can include a child relationship attribute specifying one or more child components of the component. For example, root component 310 can include a child relationship attribute, which would be set to reference components 315.

In an embodiment of the hierarchical graph, each additional layer data structure of the scene description data structure is a descendant, or sublayer, of the root layer. As an example of this embodiment, the root layer 305 is associated with one or more additional layer data structures 312 via layer relationships 325. In an embodiment, the arrangement of layer data structures 312 relative to the root layer 305 and each other specifies the layer stacking order used to combine and override opinions of component attribute values to form the composite layer. Although omitted for clarity, in an embodiment of the scene description data structure, each additional layer data structure that is not empty includes its own root component, similar to root component 310. Furthermore, sublayers can include additional components associated with their respective root components via namespace relationships.

In a further embodiment, cross-reference relationships, such as cross-reference relationship 330, provides a link to one or more components specified elsewhere. A cross-reference relationship from a first component in a first layer data structure can reference a second, target component 320 defined in the same layer data structure, in another layer data structure associated with the first layer data structure, or in another layer data structure that is not associated with the first layer data structure. Implementations of cross-reference relationships 330 can be restricted to target only the root component in another layer data structure (with any child components referenced implicitly) or alternatively can be unrestricted to directly referencing any arbitrary target component in another layer data structure.

The scene description data structure 300 can combine both layering and cross-reference relationships to specify relationships and attributes in a scene. For example, a scene description data structure can use a cross-reference relationship to link to a pirate character model to be used in a scene. The pirate character model in turn is defined by a separate scene description data structure for the model that includes its own independent root layer and optional child layers. For example, a base or weak child layer of the model's scene description data structure may define the attributes of a general biped character model. One or more stronger layers modify the general biped character model by augmenting or overriding the attribute values defined in a weaker layer, for example by associating a pirate hat model with the character model or modifying the character model to replace its hand with a hook.

In an embodiment, the graph, or set of relationships between components and layers, defined by the scene description data structure 300 can be orthogonal, or completely independent, of any other optional graphs associated with the same components. Graphs can be used to define different sets of relationships for the same components in different scenes. For example, a second scene description data structure can be created to specify different relationships between components for additional scenes. Additional layers included in the second scene description data structure can further specify different attribute values for the components.

Additional independent graphs can also be specified to facilitate specific tasks within the digital production pipeline. For example, artists can create character models with an initial set of hierarchical relationships between different body parts, such as defining an arm model to be a child of a torso model. However, the scene description data structure 300 and associated layer data structures can define one or more alternative hierarchical relationships independent of the initial set of relationships specified by the artist. For example, the arm model could be defined as the parent of the torso model to facilitate convenient animation in one or more scenes.

In an embodiment, relationship attributes of components can also specify functional relationship between components. For example, relationships between coordinate transformation components include attributes specifying a specific sequence for applying transformations to models, weights specifying the influence of a reference frame on control points, joint spring forces, and/or joint rotation limits. In a further embodiment, relationship attributes can include additional data defining some parameter of a relationship. For example, a light source component can be related to a first model component, which indicates that the light source component provides light to the model component. The lighting relationship between these two components can further include a light intensity value to indicate the intensity of light from the light source on the first model. If a second lighting relationship is created between the light source component and a second model component, the second lighting relationship can include a different light intensity value.

As described above, different layers can be specified in different portions of the digital production pipeline, enabling components to be revised or refined without the need for explicit change isolation or versioning and without destroying the data previously specified for the component in weaker layers. This allows an independent variation of a component to be created and used without affecting the usage elsewhere of either the original component or any other variation of the same component. Moreover, because layers can express opinions of value for any attribute of a component, there are no restrictions on the type or extent of modifications permitted on cross-referenced components. Furthermore, scene description data structures can include cross-reference relationships to all or a portion of a component's layer data structure, enabling other scenes to encapsulate, reuse, and optionally modify the example character model component as defined by its layers at any point of the digital production pipeline.

Figure 3A:
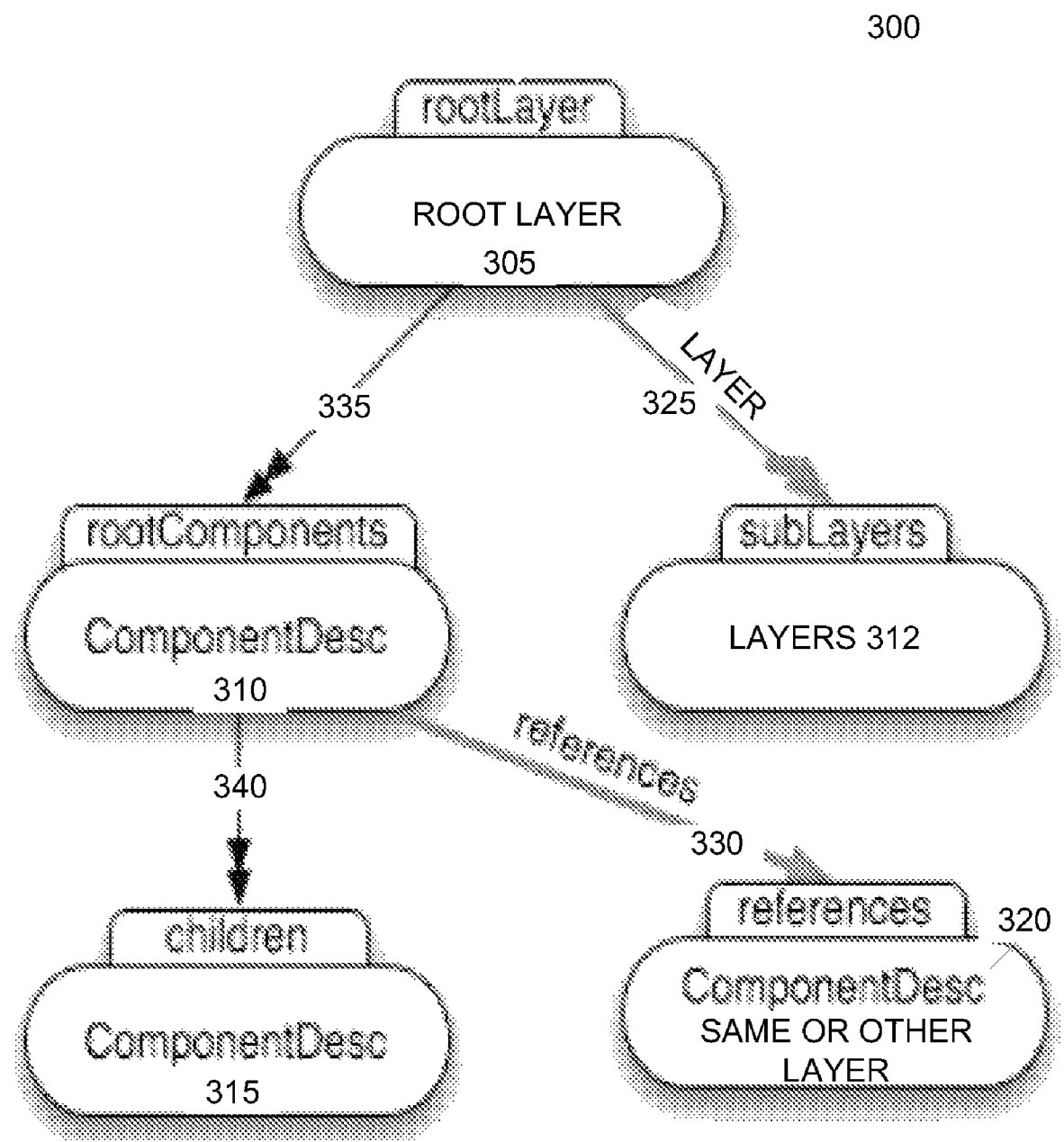
FIGS. 3A-3D illustrate a scene description data structure representing the state of a component and layer operations according to an embodiment of the invention.
Figure 3B:
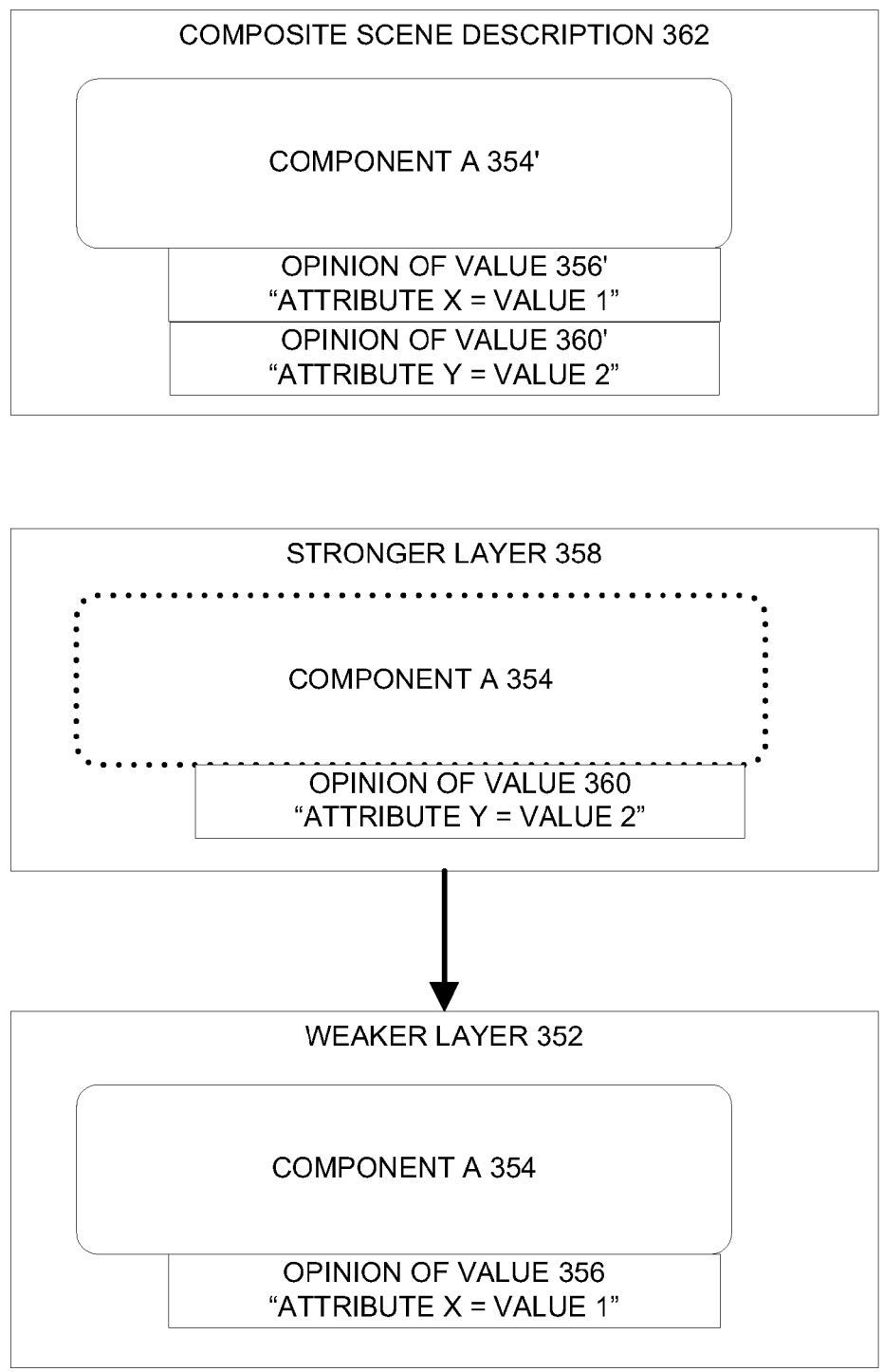

FIG. 3B illustrates a first example 350 of changing the semantic structure of components using layer data structures according to an embodiment of the invention. Example 350 includes a first layer data structure 352. Layer data structure 352 defines a first component, component A 354. Component A 354 includes a first opinion of value 356 specifying that "attribute X" has a value "Value 1." In an embodiment, both the existence "attribute X" as part of component A and its value are expressed by the first opinion of value 356. In this embodiment, there is no need for a component to have a previously declared "attribute X"; the first opinion of value 356 acts as a declaration of "attribute X" within the component and sets the value of this attribute to "Value 1."

Example 350 also includes layer data structure 358. Layer data structure 358 includes a second opinion of value 360 specifying that "attribute Y" has a value "Value 2." In an embodiment, there is no need for component A 354 to have a previously declared "attribute Y"; the second opinion of value 360 acts as a declaration of "attribute Y" within component A 354 and sets the value of this attribute to "Value 2."

A layering operation composites layer data structure 358 over layer data structure 352. The result is a composite scene description 362 including a composite version of component A 354' including "attribute X" 356' and "attribute Y" 360'.

Example 350 shows how layering can change the semantic structure of a component by adding attributes and corresponding behaviors. If a component is composited and instantiated from the first layer data structure 354 alone, it will include "attribute X" but not "attribute Y." Conversely, if a component is composited and instantiated from the second layer data structure 358 alone, the instantiated component will include "attribute Y" but not "attribute X." As a result, new attributes and behaviors can be added to a component without breaking or requiring the recompilation of previously completed work with prior versions of the component.

Figure 3C:
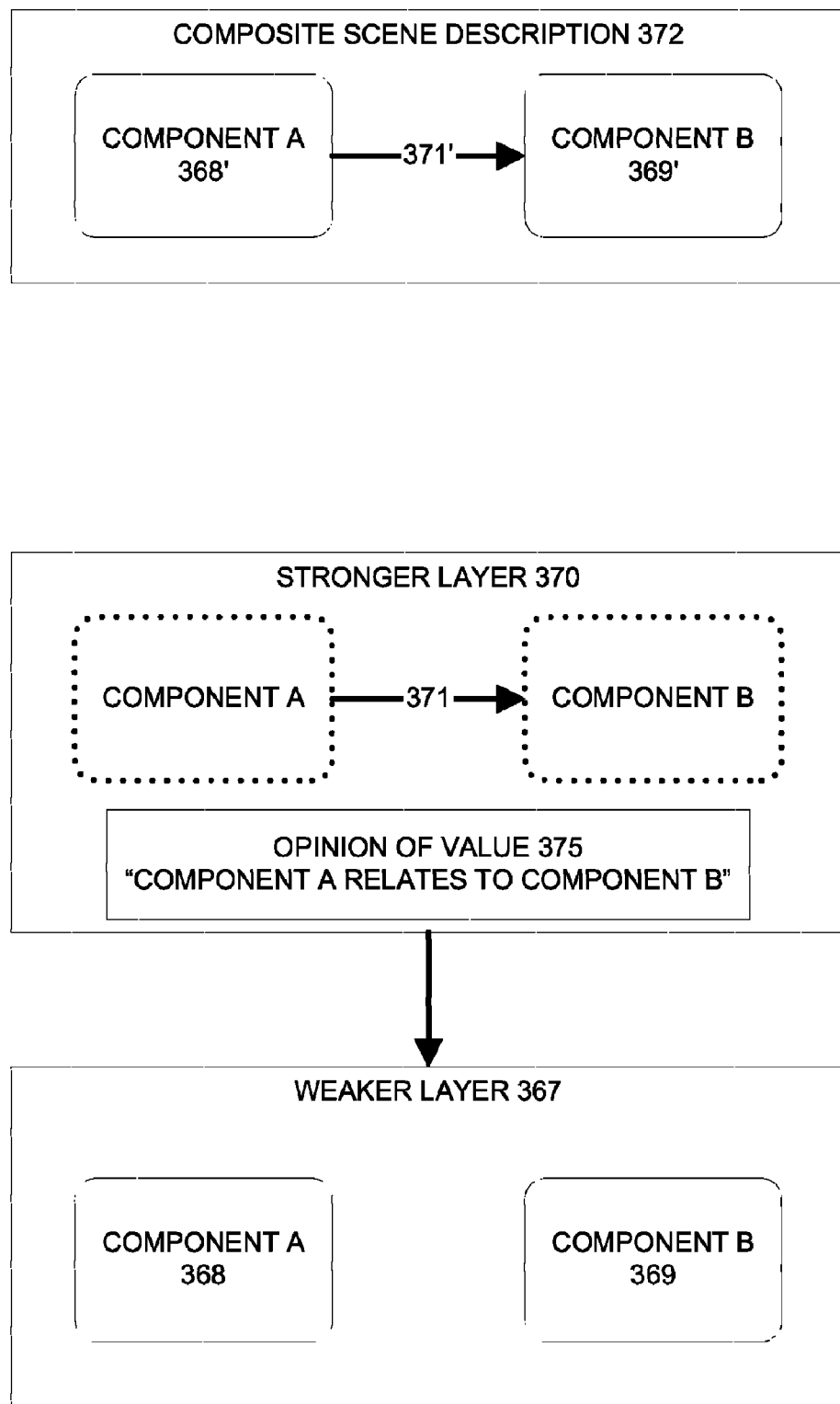

FIG. 3C illustrates a second example 365 of changing the semantic structure of components using layer data structures according to an embodiment of the invention. Example 365 includes a first layer data structure 367. Layer data structure 367 defines component A 368 and component B 369. A second layer data structure 370 defines a relationship 371 between component A 368 and component B 369. In an embodiment, relationship 371 is defined by an opinion of value 375 that declares a relationship attribute in component A 368 and/or component B 369 and assigns a value to the attribute to form the relationship 371. A layering operation composites layer data structure 370 over layer data structure 367. The result is a composite scene description 372 that includes composite versions of component A 368' and component B 369' associated by relationship 371'.

Example 365 shows how layering can change the semantic structure of components by adding a relationship between components. In an embodiment, neither component A 368 nor component B 369 as defined by layer data structure 367 need to declare an ability to form relationships with other components. In this embodiment, the opinion of value in layer data structure 370 both declares a relationship attribute for component A 368 and/or component B 369 and sets the value of the relationship attribute to form relationship 371. As a result, any type of component can be related to other components, even if the component was not originally defined with a relationship attribute.

Figure 3D:
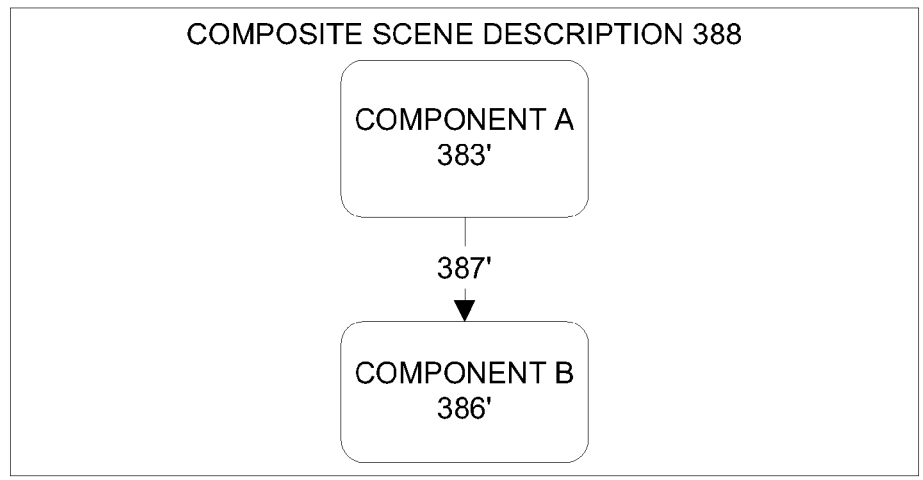
Figure 3D:
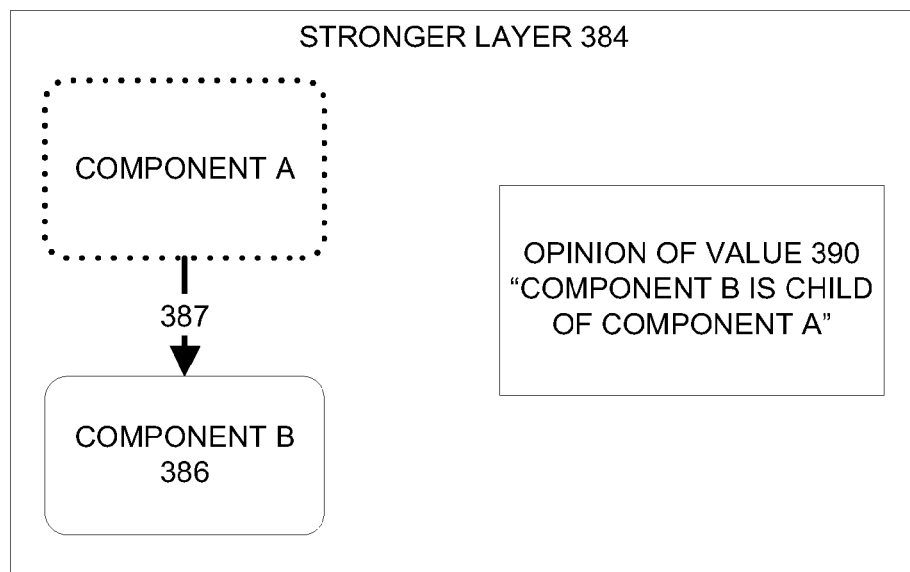
Figure 3D:
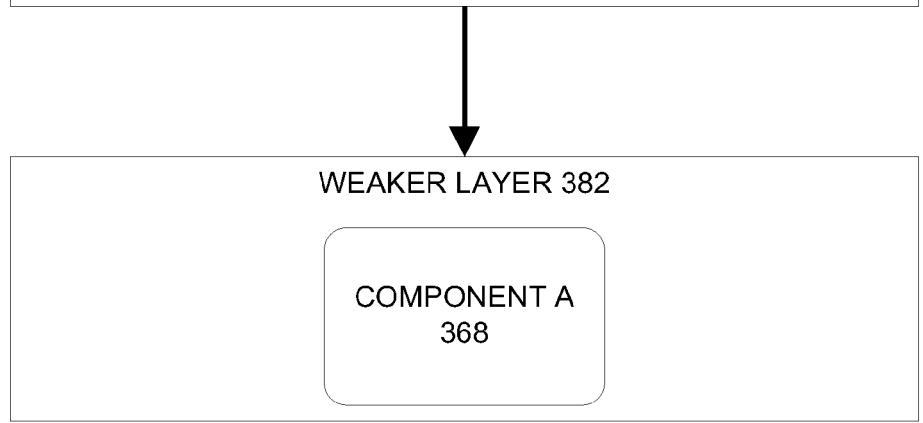

Similarly, FIG. 3D illustrates a third example 380 of changing the semantic structure of components using layer data structures according to an embodiment of the invention. Example 380 includes a first layer data structure 382. Layer data structure 382 defines component A 383. A second layer data structure 370 defines a second component B 386 and relationship 387 between component A 383 and component B 386. In an embodiment, relationship 387 is defined by an opinion of value 390 that declares a relationship attribute in component B 386 and assigns a value to the relationship attribute to form the relationship 387. In this example 380, relationship 387 defines component B 386 as a namespace child of component 383.

A layering operation composites layer data structure 384 over layer data structure 382. The result is a composite scene description 388 that includes composite versions of component A 383' and component B 386' associated by relationship 387'. In composite scene description 388, component B 386' is the namespace child of component A 383'.

Example 385 shows how layering can change the semantic structure of components by adding a new component to the namespace associated with a previously defined component. Component 383 as defined in layer data structure 382 does not need to declare any relationship with other components or even the ability for component 383 to act as a parent or child of any other components. In an embodiment, an opinion of value in layer data structure 384 both declares the existence of an attribute defining a namespace relationship and sets its value form relationship 387.

Figure 4:
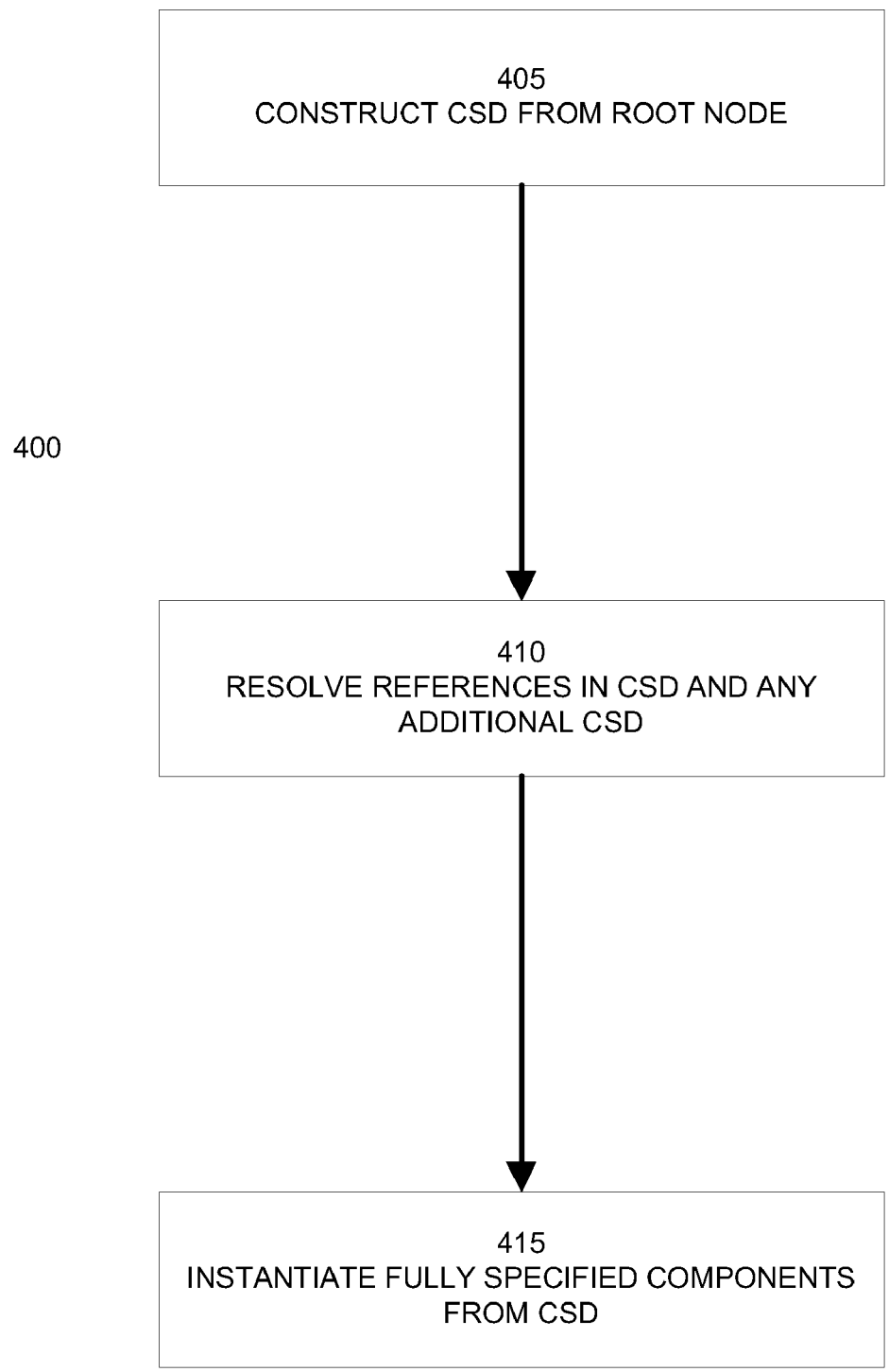
FIG. 4 illustrates a method of processing a scene description data structure according to an embodiment of the invention.

FIG. 4 illustrates a method 400 of processing a scene description data structure according to an embodiment of the invention. Method 400 constructs a composite scene description (CSD) for a scene description data structure. A composite scene description is a data structure specifying all of the authored components associated with a scene, the authorized relationships between all of the components in the scene, and all of the authored component attribute values associated with the scene. In an embodiment, the composite scene description includes sufficient information to instantiate all of the components of the scene on the stage data structure 120 in system 100.

Step 405 selects the root layer of the scene description data structure and constructs a corresponding composite scene description. As discussed in detail below, a composite scene description is constructed by starting at the root layer and traversing the component and layer hierarchies defined in the scene description data structure. The namespace hierarchy between components defines relationships between components and a layer stacking order defines the order for combining layers into a single composite layer. The layers and components associated with the scene description data structure are composited according to this layer stacking order to determine a composite scene description or composite layer specifying at least a portion of the component attribute values for a scene.

Step 410 resolves cross-references in the composite scene description. As discussed above, the scene description data structure can include cross-reference relationships between components. In an embodiment, step 410 resolves these cross-reference relationships, if any, in the composite scene description to fill in any "gaps" in the scene. The details of step 410 are discussed below.

Following step 410, the composite scene description fully specifies all of the components associated with a scene, the relationships between all of the components in the scene, and all of the authored component attribute values associated with the scene. Step 415 then instantiates the components of the scene, for example within a stage data structure, using the composite scene description. Further embodiments of the invention may cache all or portions of the composite scene description to expedite the processing, instantiation, and assembly of components in the scene data structure for editing, rendering, or inspecting components and digital assets at any part of the digital production pipeline. For example, the composite scene description can be stored as a new digital asset for later use.

Figure 5:
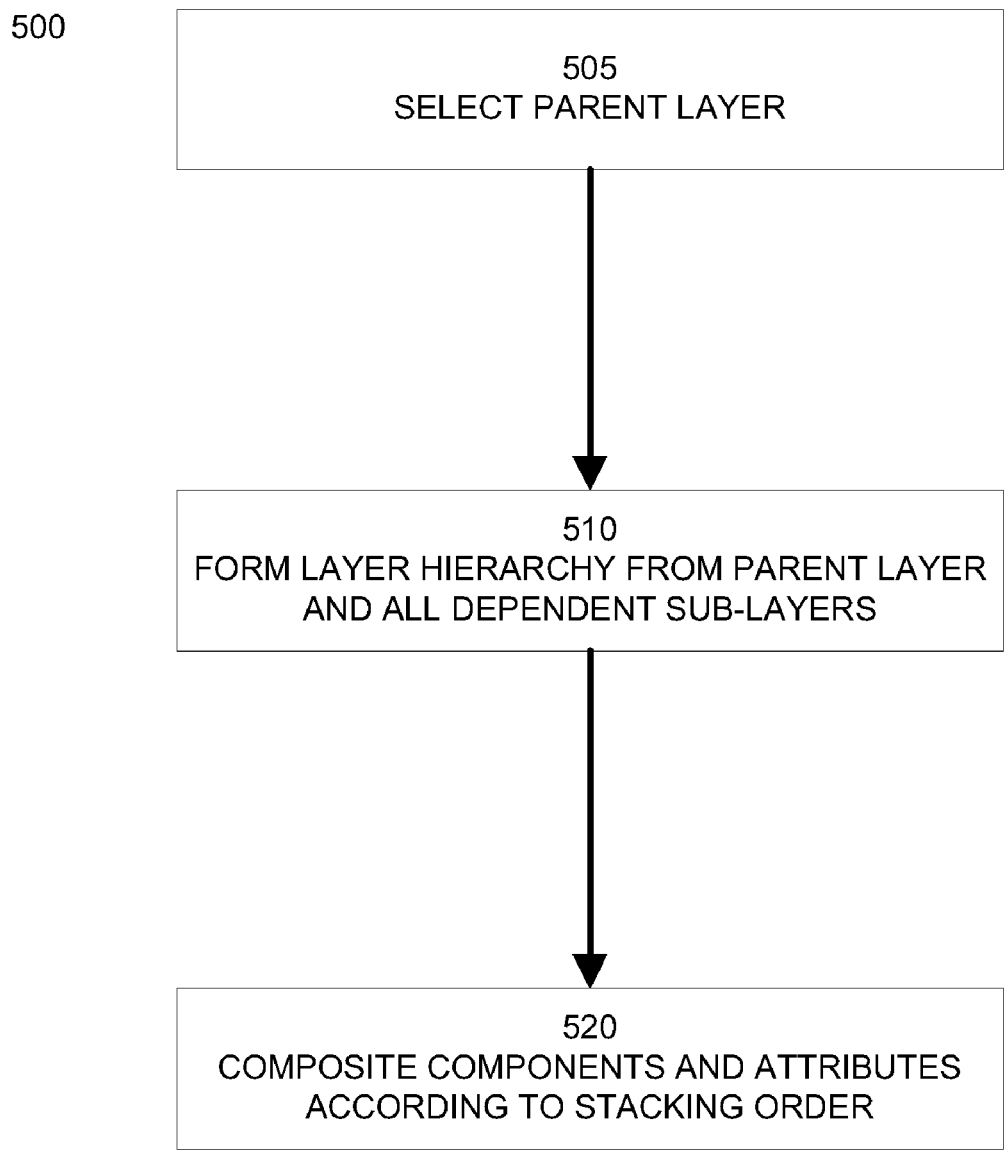
FIG. 5 illustrates a first phase of a method of processing a scene description data structure according to an embodiment of the invention.

FIG. 5 illustrates a first phase 500 of a method of processing a scene description data structure according to an embodiment of the invention. Phase 500 constructs a new composite scene description from a scene description data structure.

Phase 500 is initialized with a reference to a selected layer of scene description data structure. An embodiment of phase 500 creates a new composite scene description with components, component attributes, and component relationships provided by the selected layer and its descendent layers. In one application, step 405 selects the root layer of the scene description data structure and invokes phase 500 to produce a composite scene description. In other applications, discussed below, a different layer may be selected to produce an additional composite scene description.

Step 505 of phase 500 selects a root layer data structure. In an embodiment, the root layer data structure corresponds with the selected layer of the scene description data structure provided to phase 500.

Step 510 determines a layer hierarchy from the scene description data structure. In an embodiment, step 510 recursively processes the scene description data structure to build a hierarchy of layers descended from the selected root layer. The layer hierarchy defines the layer stacking order used to composite layers. In an embodiment, step 510 recursively traverses the layer hierarchy defined by the scene description data structure to determine the layer stacking order for layer data structures. In an embodiment, step 510 traverses all of the descendent layers of the selected root layer until all of the leaf, or bottom, layers are reached.

Figure 6A:
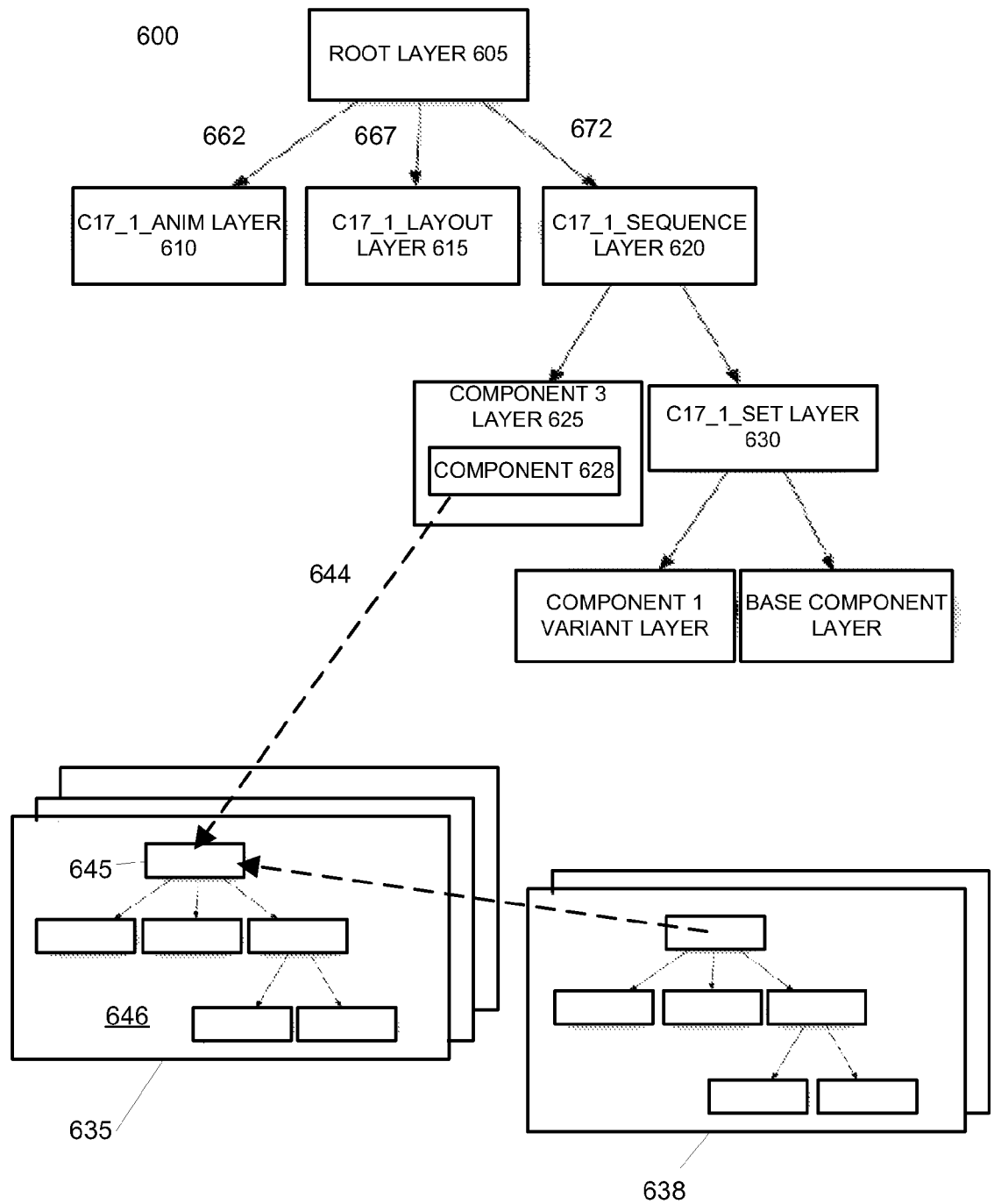
FIGS. 6A-6B illustrate an example scene description data structure and corresponding layer data structure according to an embodiment of the invention.
Figure 6B:
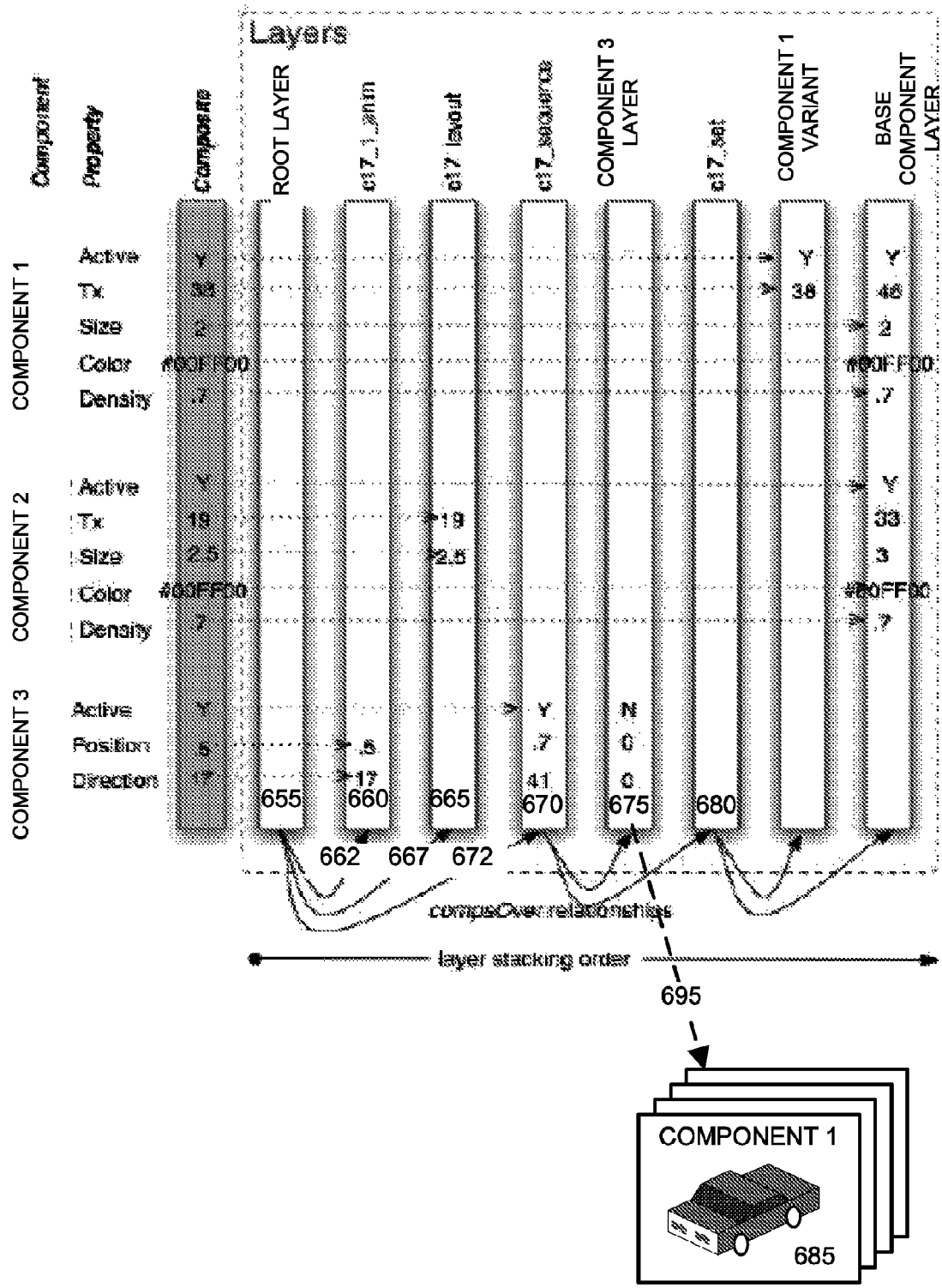

FIG. 6A illustrates an example hierarchy of layers 600 produced by step 510. FIG. 6B illustrates a corresponding example layer stacking order 650 produced by step 510. For example, the selected root layer 605 in hierarchy 600 is the root layer 655 in the layer stacking order 650. The children 610, 615, and 620 of layer 605 correspond with layers 660, 665, and 670 in stacking order 650. Links 662, 667, and 672 define layer stacking order 650 between layer 655 and layers 660, 665, and 670, respectively, which indicate that these three child layers are to be combined or composited immediately under the root layer 655. Root layer 665, corresponding with layer 605, and child layers 660, 665, and 670, corresponding with layers 610, 615, and 620, may each specify opinions of value for attributes of one or more components.

Furthermore, example layer stacking order 650 includes layers 675 and 680, corresponding with layers 625 and 630, that are composited under layer 670. Layer 625 includes a component 628. Component 628 has a cross-reference relationship 644 with component 645. Example layer stacking order 650 includes cross-reference information 695 corresponding with the cross-reference relationship 644. In this example, component 645 is the root component in an additional hierarchical graph of components 646. Furthermore, this additional hierarchy of components 646 is defined by another set of layer data structures 635 composited according to its own layer stacking order.

As discussed elsewhere, an embodiment of the invention will later resolve the cross-reference relationship 644 to fill in any "gaps" in the composite scene description. Once cross-referenced component 645 (and any of its child components) have been incorporated into the hierarchy 600, any of the attribute values of component 645 can be overridden by layers in hierarchy 600. Furthermore, the hierarchy of components 646 defined by the set of layer data structures 635 can be independently cross-referenced with and optionally modified by numerous other hierarchies of components, such as hierarchy 638. Modifications to a component in one hierarchy, such as a layer in hierarchy 600 modifying component 645, will not affect the same component referenced in another hierarchy, for example hierarchy 638.

Step 520 composites the data of the layer hierarchy according to the layer stacking order determined in step 515 to create a composite scene description. In embodiments of step 520, the layer stacking order is traversed from top to bottom or from bottom to top. Data from each layer is added to a composite scene description if composite scene description does not already include corresponding data from a layer higher in the layer stacking order. Conversely, data in a higher layer will overwrite corresponding data from a lower layer in the composite scene description. FIG. 6B illustrates an example composite scene description 685 corresponding with the set of layers 635 in FIG. 6A.

In an embodiment, step 520 further integrates cross-reference information from the layer stacking order into the composite scene description. The cross-reference information will be resolved later to augment the composite scene description with additional data.

Figure 7:
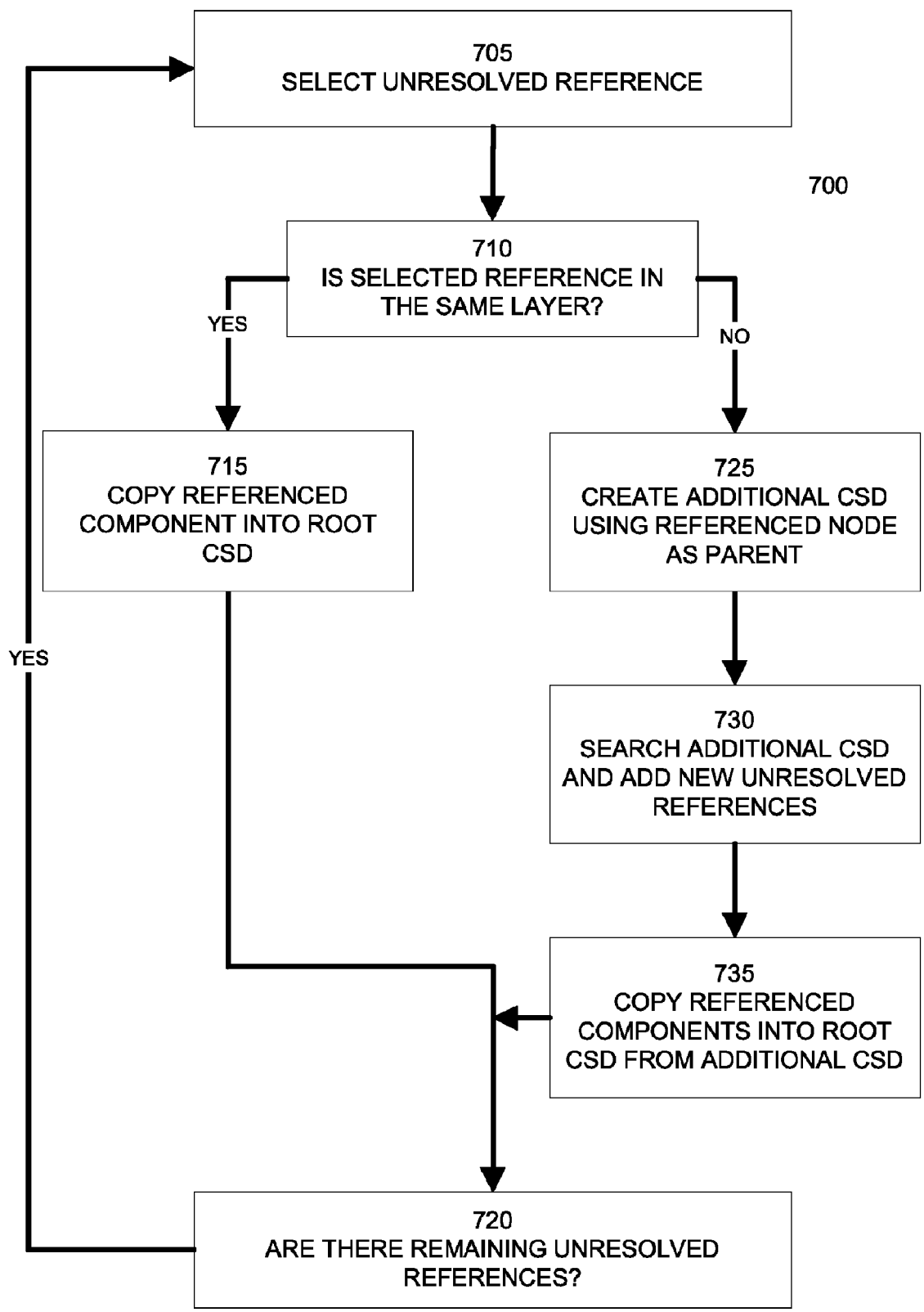
FIG. 7 illustrates a second phase of a method of processing a scene description data structure according to an embodiment of the invention.

FIG. 7 illustrates a second phase 700 of a method of processing a scene description data structure according to an embodiment of the invention. As discussed above, step 410 of method 400 resolves cross-references in the composite scene description. In an embodiment, phase 700 is used to resolve cross-reference relationships in the composite scene description.

Step 705 of phase 700 analyzes the composite scene description and generates a list of all the unresolved cross-reference relationships. Step 705 selects an unresolved cross-reference relationship for processing. Step 710 analyzes the selected cross-reference relationship to determine if the parent and child components of the cross-reference relationship are in the same layer. If so, then step 715 copies the data associated with the child component into the parent component's location in the composite scene description. Following step 715, phase 700 proceeds to step 720.

Figure 8A:
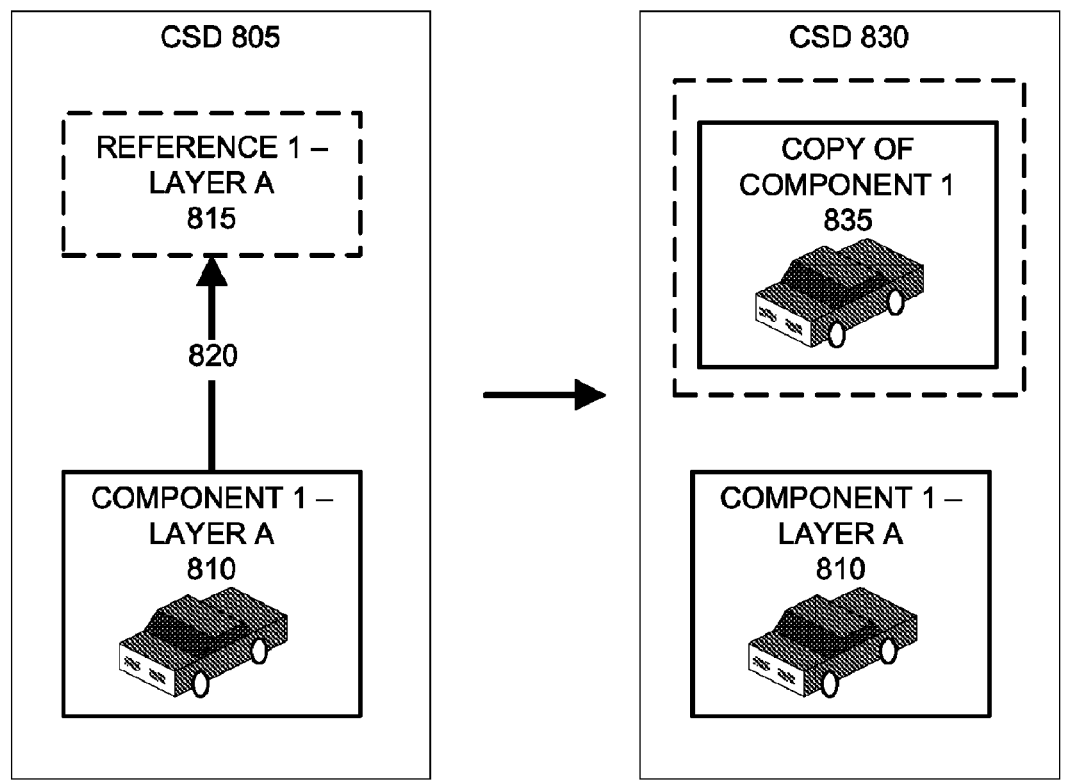
FIGS. 8A-8B illustrate example applications of the second phase of a method of processing a scene description data structure according to an embodiment of the invention.

FIG. 8A illustrates an example application of step 715 of phase 700 according to an embodiment of the invention. FIG. 8A includes an example composite scene description 805. Example composite scene description 805 includes a component 810, labeled component 1. Component 810 includes information indicating its layer of origin in the scene description data structure, which in this example is "layer A." Composite scene description 805 also includes a cross-reference 815. Cross-reference 815 is linked to component 810 via link 820. Additionally, cross-reference 815 includes information indicating its layer of origin in the scene description data structure, which in this example is also layer A.

As discussed above, because component 810 and cross-reference 815 both originate from the same layer, phase 700 can use step 715 to copy the information of component 810 in place of cross-reference 815, thereby removing cross-reference 815 from the composite scene description 805. Following step 715, a revised composite scene description 830 includes the component 810 and a copy 835 of component 810 in place of the cross-reference 815. In an embodiment, once the cross-reference 815 is resolved, the copy 835 becomes a separate component that is independent of component 810.

Returning to phase 700, if step 710 determines that the parent and child components of the selected reference are not in the same layer, then phase 700 proceeds to step 725. Step 725 creates an additional composite scene description. In an embodiment, step 725 selects the child component of the cross-reference relationship. The child component can be included in the same scene description data structure or a different scene description data structure as the parent component of the cross-reference relationship. Step 725 provides this selected component as the top-level node to phase 500 to produce an additional composite scene description. The additional composite scene description specifies the component, component relationships, and component attribute values for the selected component and any descendent component. As discussed above, the additional composite scene description can include data resulting from the compositing of two or more layers according to a layer stacking order defined by a layer hierarchy associated with the selected child component.

Step 730 searches the additional composite scene description for any new cross-reference relationships. The additional composite scene description can include new cross-reference relationships if the selected component or any descendents of the selected component have cross-reference relationships. Step 730 adds the new cross-reference relationships in the additional composite scene description, if any exist, to the list of unresolved cross-reference relationships.

Step 735 copies the data of the additional composite scene description into the root, or main, composite scene description previously generated in step 405. In an embodiment, the data of the additional composite scene description replaces the selected cross-reference in the composite scene description. After the data from the additional composite scene description is copied into the composite scene description, an embodiment of step 735 discards the additional composite scene description.

Figure 8B:
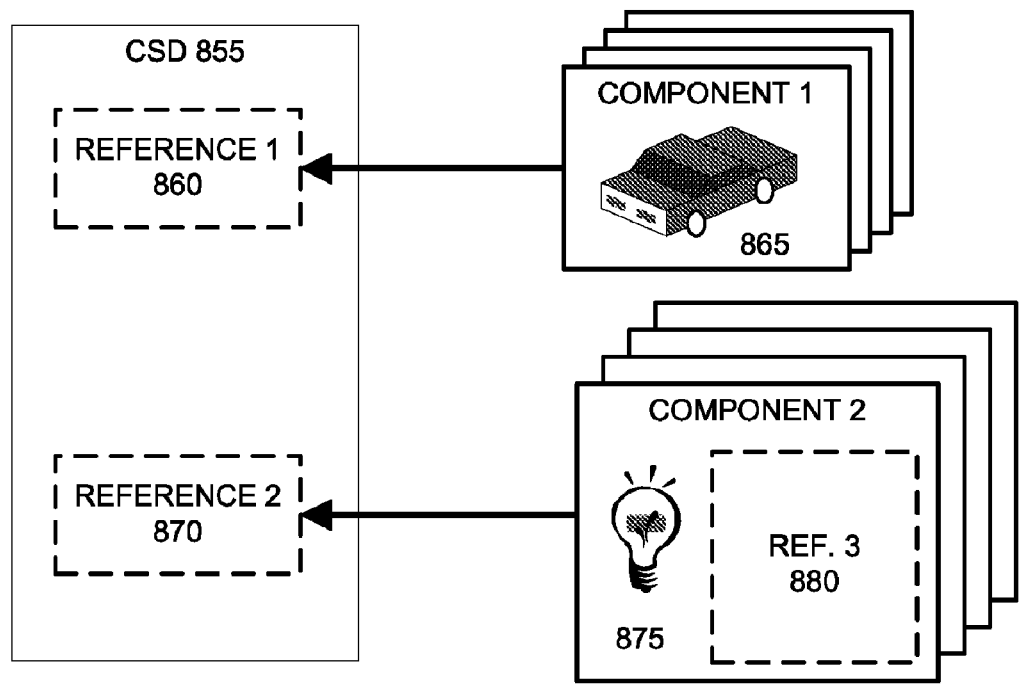

FIG. 8B illustrates an example application 850 of steps 725, 730, and 735. FIG. 8B includes an example composite scene description 855. Example composite scene description 855 includes cross-references 860 and 870. Steps 725, 730, and 735 create an additional composite scene description 865, which can include the composition of two or more layers, and copy the data of additional composite scene description 865 in place of the cross-reference 860. Similarly, steps 725, 730, and 735 create an additional composite scene description 875, which can include the composition of two or more layers, and copy the data of additional composite scene description 875 in place of the cross-reference 870. In this example, additional composite scene description 875 includes an additional cross-reference 880. Step 730 adds cross-reference 830 to the unresolved references associated with composite scene description 855.

Following step 735 or step 715, step 720 determines if there are any unresolved cross-references in the composite scene description. As discussed above, unresolved cross-references can arise from cross-references added to the composite scene description in step 405 or from cross-references copied into the composite scene description in step 735. In an embodiment, step 720 determines if there are any unresolved cross-references remaining in the list of unresolved cross-references associated with the composite scene description. If so, then phase 700 proceeds from step 720 back to step 705 to select and process a remaining unresolved cross-reference. In an embodiment, phase 700 is repeated until there are no unresolved cross-references remaining in the composite scene description.

Figure 9:
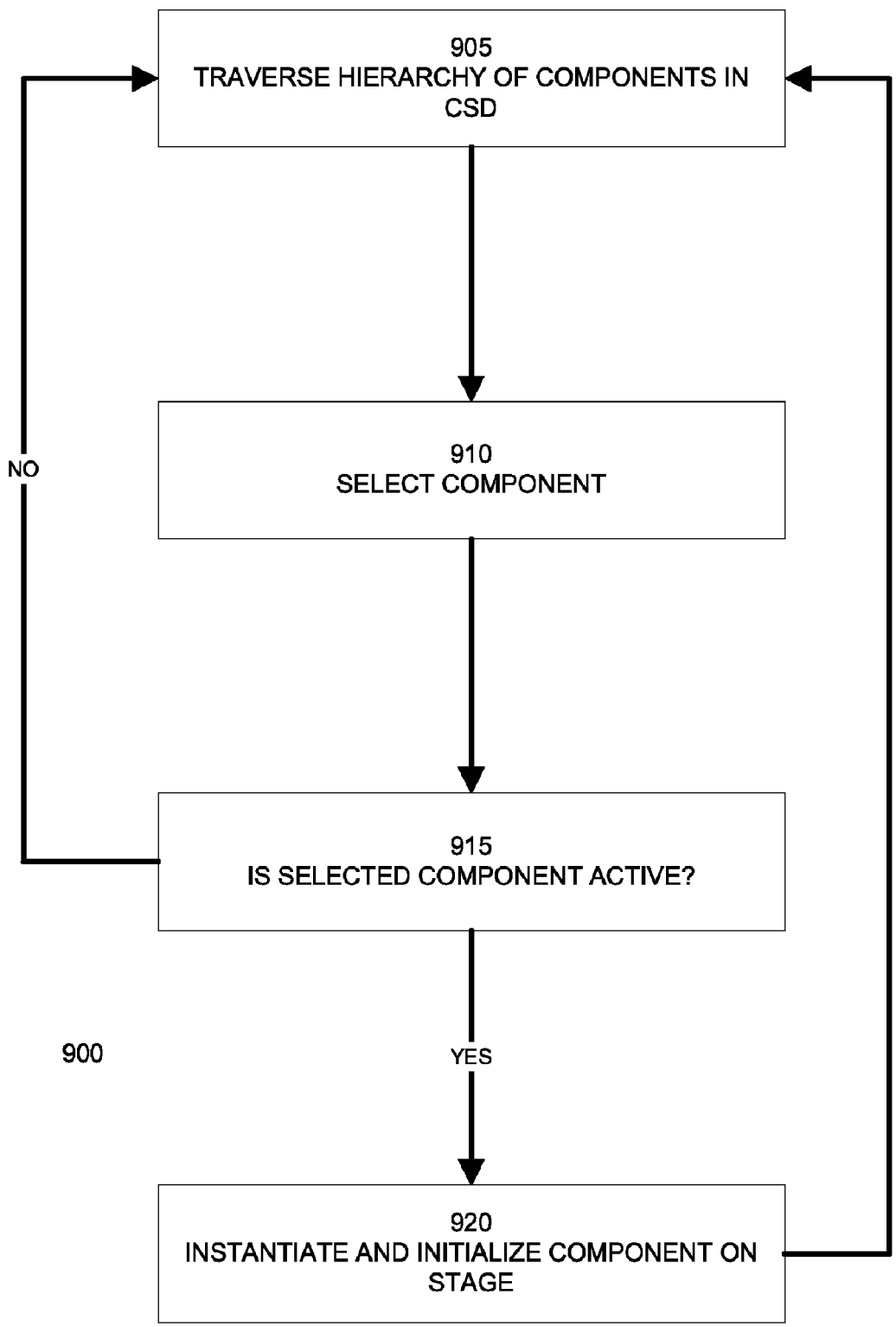
FIG. 9 illustrates a third phase of a method of processing a scene description data structure according to an embodiment of the invention.

FIG. 9 illustrates a third phase 900 of a method of processing a scene description data structure according to an embodiment of the invention. As discussed above, step 415 of method 400 instantiates components from the composite scene description. In an embodiment, phase 900 is used to instantiate components in a stage 120 using the composite scene description.

Step 905 of phase 900 traverses a hierarchy of components in the composite scene description. In an embodiment, a component includes attributes associating itself with one or more independent hierarchies. An example type of hierarchy of components that can be included in the composite scene description is a namespace hierarchy. A namespace hierarchy specifies the relationship between components according to their names. In some applications, the namespace hierarchy may also correspond with the data paths used to store components.

Step 905 traverses a hierarchy of components, such as a namespace hierarchy or any other type of hierarchy defined for the components, to identify at least one of the components in the composite scene description.

Step 910 selects one of the components of the composite scene description for evaluation. Step 915 determines if the selected component is active. In an embodiment, a component includes an active attribute that indicates whether the component should be instantiated on the stage. The active attribute can be set within one or more layers and changed over time, enabling components to be selectively instantiated or hidden in the stage as needed.

If step 915 determines that the selected component is not active, phase 900 returns to step 905 to search for any additional components. Conversely, if step 915 determines that the selected component is active, phase 900 proceeds to step 920.

Step 920 instantiates and initializes the selected component on the stage. In an embodiment, step 920 evaluates a name attribute and a type attribute of the selected component in the composite scene description. Using this evaluation, step 920 instantiates a new data object corresponding with the selected component on the stage. Step 920 initializes the new data object by evaluating the attributes and values of the selected component in the composite scene description and setting corresponding properties of the new data object to the same values. Additionally, an embodiment of step 920 replicates one or more hierarchical relationships associated with the component for the corresponding data object in the stage. Following step 920, phase 900 returns to step 905 to search for any additional components in the composite scene description.

Figure 10:
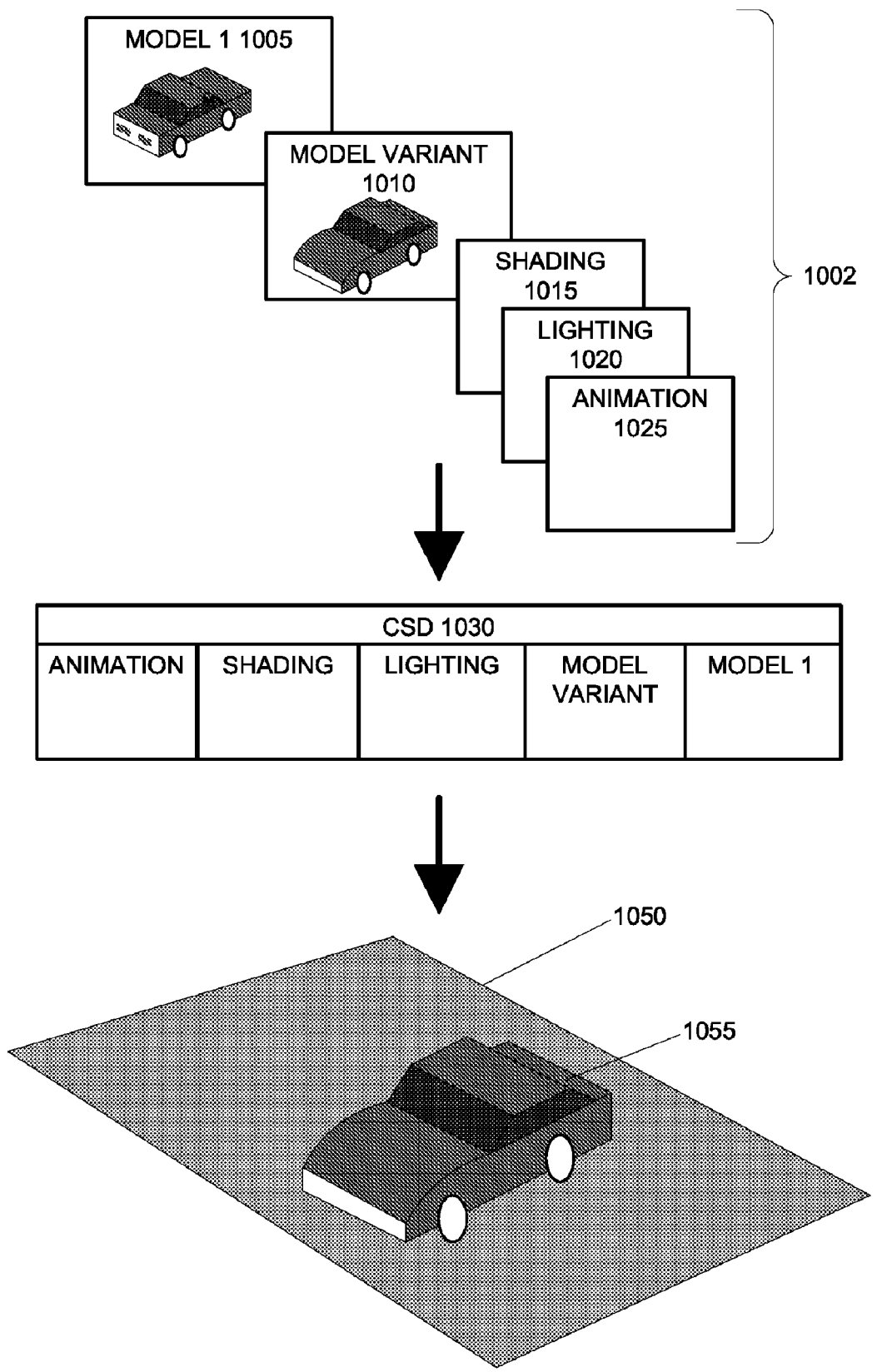
FIG. 10 illustrates an example application of the second phase of a method of processing a scene description data structure according to an embodiment of the invention.

FIG. 10 illustrates an example application 1000 of a method of processing a scene description data structure according to an embodiment of the invention. Example application 1000 includes example layers 1002 defining a scene. In an embodiment, these layers 1002 form one or more layer hierarchies, as described above. The components defined by layers 1002 can specify cross-reference relationships to other components in the same or a different layers. These example layers 1002 include a base model layer of a car, 1005, and a model variant layer, 1010, that specifies changes to the base model, such as a different car body style. Additional layers include shading layer 1015, lighting layer 1020, and animation and articulation layer 1025.

The example layers 1002 are combined into a composite scene description 1030. The composite scene description 1030 only includes attribute values defined by the strongest layer associated with each component attribute. Attribute values in weaker layers that are overridden by stronger layers are omitted from the composite scene description 1030. In this example, some of the attribute values of the base model layer 1005 are overridden by the attribute values of the model variant layer 1010. The only attribute values of the base model layer 1005 that are included in composite scene description 1030 are those not overridden by layers 1010, 1015, 1020, and 1025.

The composite scene description 1030 is used to instantiate objects on the stage 1050. In this example, the composite scene description 1030 specifies the components and attributes to create, shade, light, and animate object 1055 in stage 1050.

Although the above described systems and methods have been described with reference to components, digital assets, and digital production pipelines, the scene description data structure and its layering and cross-referencing relationships can be generalized for use with applications and data of any type, including electronic documents such as text and word processing data; spreadsheet data; database tables and objects; engineering blueprints, schematics, and specifications; and object-orientated data structures. The generalized forms of these data structures and the above-described methods of manipulating these data structures are particularly useful in non-linear workflows. Nonlinear workflows can include collaborative working environments in which multiple users work on the same data. Nonlinear workflows can also enable one or more users to generate multiple variations of the data at any arbitrary point of the workflow without destroying data associated with previous or subsequent portions of the workflow. For example, a user could use the above described systems and methods to create multiple financial scenarios within a spreadsheet application based on a common set of initial conditions.

FIG. 11 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio / video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A data structure for representing at least one component, the data structure embedded in a computer-readable data storage medium, the data structure comprising:

a first layer specifying a first opinion value of a first attribute of an indeterminate component incompletely defined by the first layer; a second layer specifying a first opinion value of a second attribute of the indeterminate component incompletely defined by the second layer, wherein the second layer has a first layer-relationship with the first layer, wherein the second attribute is undeclared in the first layer such that the first layer has no explicit or implicit representation of the existence or value of the second attribute; and wherein the first layer-relationship directs a processor to perform a layer composition including the first and second layers to create a determinate component including the first and second attributes; wherein the layer composition is adapted to direct a processor to override at least a portion of any other opinions of value of the first attribute from any other layers weaker than the first.

2. The data structure of claim 1, wherein the first layer-relationship specifies that the first attribute of the determinate component has the first opinion value and the second attribute of the determinate component has the second opinion value.

3. The data structure of claim 1, further comprising:

a third layer specifying a second opinion value of the first attribute of the indeterminate component, wherein the third layer has a second layer-relationship with the first layer; and wherein the first and second layer-relationships directs a processor to perform a second layer composition including the first, second and third layers to create a second determinate component in which the second opinion value of the first attribute of the indeterminate component overrides the first opinion value of the first attribute of the indeterminate component, such that the first attribute of the second determinate component has the second opinion value of the first attribute and the second attribute of the component has the first opinion value of the second attribute.

4. The data structure of claim 1, wherein the second layer further includes a second opinion value of the first attribute of the indeterminate component, wherein the first layer-relationship directs a processor to perform a second layer composition including the first and second layers to create a second determinate component in which the second opinion value of the first attribute of the indeterminate component overrides the first opinion value of the first attribute of the indeterminate component, such that the first attribute of the second determinate component has the second opinion value of the first attribute and the second attribute of the second determinate component has the first opinion value of the second attribute.

5. The data structure of claim 1, wherein the first opinion value of the first attribute of the indeterminate component is a cross-reference to a second component having an attribute specified by at least one additional layer.

6. The data structure of claim 1, wherein the first opinion value of the second attribute specifies a behavior of the indeterminate component, wherein the behavior is undeclared by the first layer.

7. The data structure of claim 6, wherein the behavior is undeclared outside of the second layer.

8. The data structure of claim 6, wherein the first opinion value of the second attribute specifies data associated with the behavior of the component, wherein the data is undeclared outside of the second layer.

9. The data structure of claim 1, wherein the first opinion value of the second attribute specifies data of the indeterminate component, wherein the data is undeclared outside of the second layer.

10. The data structure of claim 9, wherein the data includes computer graphics data.

11. The data structure of claim 10, wherein the computer graphics data is selected from a group consisting of geometry data; texture data; lighting data; shading data; animation data; simulation data; layout data; articulation data; and rendering data.

12. The data structure of claim 9, wherein the data includes spreadsheet data.

13. The data structure of claim 9, wherein the data includes a database table.

14. The data structure of claim 1, wherein the first opinion value of the second attribute specifies a component-relationship between the indeterminate component and a second component.

15. The data structure of claim 14, wherein the component-relationship specifies that the indeterminate component is a parent of the second component.

16. The data structure of claim 14, wherein the component-relationship specifies that the indeterminate component is a child of the second component.

17. The data structure of claim 1, wherein the relationship between the first layer and the second layer is part of a hierarchy of layers.

18. The data structure of claim 17, wherein the hierarchy of layers defines a layer stacking order between the first layer and the second layer.

19. The data structure of claim 18, wherein the first layer-relationship specifies that the second layer is stronger than the first layer in the layer stacking order.

20. The data structure of claim 1, wherein the first attribute of the determinate component specifies whether the determinate component is active.

21. The data structure of claim 1, wherein a set of layers including at least the first and second layers are adapted to be composited according to at least the first layer-relationship to form a composite description specifying the complete authored state of the component.

22. A data structure for representing at least two components, the data structure embedded in a computer-readable data storage medium, the data structure comprising:
a first layer specifying at least a portion of a first component and at least a portion of a second component; and a second layer specifying a first indeterminate component-relationship between the first and second components that is incompletely defined by the second layer, wherein the second layer has a first layer-relationship with the first layer; wherein the first layer-relationship directs a processor to perform a layer composition including the first and second layers to create an association of components including the first and second components, wherein the association of components includes a first determinate component-relationship between the first and second components; wherein the first indeterminate component-relationship is undeclared in the first layer such that the first layer has no explicit or implicit representation of the existence or value of any relationship between the first and second components; wherein the layer composition is adapted to direct a processor to override at least a portion of any other opinions of value of the first indeterminate component-relationship from any other layers weaker than the first.

23. The data structure of claim 22, wherein the first layer includes a second indeterminate component-relationship between the first and second components, wherein the first layer-relationship overrides the second component-relationship, such that the association of components includes the first determinate component-relationship between the first and second components.

24. The data structure of claim 22, further comprising:
a third layer specifying a second indeterminate component-relationship between the first and second components, wherein the third layer has a second layer-relationship with at least the second layer and wherein the second layer-relationship overrides the first indeterminate component-relationship, such that the association of components includes a second determinate component-relationship between the first and second components.

25. The data structure of claim 22, wherein the association of the first and second components includes an attribute of the first determinate component-relationship.

26. The data structure of claim 25, further comprising:
a third layer specifying an opinion value of an attribute of the first indeterminate component-relationship, wherein the third layer has a second layer-relationship with at least the second layer directing a processor to perform a second layer composition including the first, second, and third layers to create the association of components including the second opinion value of the attribute of the first determinate component-relationship, wherein the attribute of the first indeterminate component-relationship is undeclared in the first or second layers.

27. The data structure of claim 26, wherein the attribute of the first determinate component-relationship is undeclared outside of the third layer.

28. The data structure of claim 25, wherein the second layer includes a first opinion value of the attribute of the first indeterminate component-relationship; and the data structure includes:
a third layer specifying a second opinion value of the attribute of the first indeterminate component-relationship, wherein the third layer has a second layer-relationship with at least the second layer, wherein the second layer-relationship partially overrides the first layer-relationship such that the association of components includes the first determinate component-relationship between the first and second components and wherein the association of components includes the second opinion value of the attribute of the first indeterminate component-relationship.

29. The data structure of claim 25, wherein the first determinate component-relationship is a lighting relationship and the attribute is a lighting attribute.

30. The data structure of claim 25, wherein the first determinate component relationship is a transformation relationship and the attribute specifies an aspect of a coordinate transformation.

31. The data structure of claim 25, wherein the attribute of the first determinate component-relationship specifies a behavior of the first-component relationship.

32. The data structure of claim 31, wherein the second layer includes a first opinion value of the attribute of the first indeterminate component-relationship and the behavior of the first indeterminate component relationship is undefined outside of the second layer.

33. A method of specifying the state of a component, the method comprising:
receiving a data structure including sparsely populated layers, wherein at least a portion of the layers each express at least one opinion value of an attribute of an incomplete authored state of an indeterminate component, wherein for the portion of the layers, the attributes are undeclared outside of their respective layers such that there are no explicit or implicit representations of the existence or values of the attributes outside their respective layers; creating an initial composite description of a determinate component by compositing the layers; and resolving cross-references of the composite description of the determinate component to determine a complete authored state of the determinate component capable of being instantiated; wherein creating an initial composite description of a determinate component by compositing the layers comprises directing a processor to override at least a portion of the opinions of value of the attributes of the incomplete authored state of the indeterminate component from the weaker layers with corresponding portions of the opinions of value of the attributes of the incomplete authored state of the indeterminate component from stronger layers.

34. The method of claim 33, wherein creating the initial composite description comprises:
determining a layer stacking order for the layers; and
compositing the layers according to the layer stacking order.

35. The method of claim 34, wherein determining a layer stacking order comprises:
determining a layer hierarchy from relationships defined between the layers; and
determining the layer stacking order from the layer hierarchy.

36. The method of claim 33, wherein resolving cross-references of the composite description comprises:
identifying unresolved reference relationships in the composite description;
for each unresolved reference relationship, locating a target of the unresolved reference relationship; and
copying the target of the unresolved reference relationship in place of the unresolved reference relationship.

37. The method of claim 36, wherein copying the target of the reference relationship includes creating an additional composite description for the target of the reference relationship.

38. The method of claim 37, wherein creating the additional composite description for the target of the reference relationship includes:
identifying a target set of at least one layer associated with the target of the reference relationship;
determining a target layer stacking order for the target set of layers; and
compositing the target set of layers according to the target layer stacking order to create the additional composite description.

39. The method of claim 36, wherein copying the target of the reference relationship includes copying the target of the reference relationship from a first portion of one of the layers to a second portion of the one of the layers.

40. The method of claim 33, further comprising:
instantiating the determinate component from the composite description.

41. The method of claim 40, wherein instantiating comprises:
determining if an active attribute of the determinate component in the composite description is true; and
in response to a determination that the active attribute is true:
instantiating a data object corresponding with the determinate component; and
initializing the data object according to the attribute values specified by the composite description.

42. The method of claim 40, wherein the determinate component is instantiated in a stage data structure of a digital production pipeline system.

43. The method of claim 42, wherein the stage data structure is adapted to be accessed by a pipeline application.

44. The method of claim 43, wherein the pipeline application is selected from a group consisting of a modeling application; a texturing application;
a shading application; an articulation application; an animation application; a lighting application; a layout application; a simulation application; a rendering application; a spreadsheet application; a database application; and an application adapted to manipulate electronic documents.

45. A computer-readable storage medium including instructions adapted to direct a computer to perform an operation, the operation comprising: receiving a data structure including sparsely populated layers, wherein at least a portion of the layers each express at least one opinion value of an attribute of an incomplete authored state of an indeterminate component, wherein for the portion of the layers, the attributes are undeclared outside of their respective layers such that there are no explicit or implicit representations of the existence or values of the attributes outside their respective layers; creating an initial composite description of a determinate component by compositing the layers; and resolving cross-references of the composite description of the determinate component to determine a complete authored state of the determinate component capable of being instantiated; wherein creating an initial composite description of a determinate component by compositing the layers comprises directing a processor to override at least a portion of the opinions of value of the attributes of the incomplete authored state of the indeterminate component from the weaker layers with corresponding portions of the opinions of value of the attributes of the incomplete authored state of the indeterminate component from stronger layers.

46. The computer-readable medium of claim 45, wherein creating the initial composite description comprises:
determining a layer stacking order for the layers; and
compositing the layers according to the layer stacking order.

47. The computer-readable medium of claim 46, wherein determining a layer stacking order comprises:

determining a layer hierarchy from relationships defined between the layers; and determining the layer stacking order from the layer hierarchy.

48. The computer-readable medium of claim 45, wherein resolving cross-references of the composite description comprises:

identifying unresolved reference relationships in the composite description;

for each unresolved reference relationship, locating a target of the unresolved reference relationship; and copying the target of the unresolved reference relationship in place of the unresolved reference relationship.

49. The computer-readable medium of claim 48, wherein copying the target of the reference relationship includes creating an additional composite description for the target of the reference relationship.

50. The computer-readable medium of claim 49, wherein creating the additional composite description for the target of the reference relationship includes:

identifying a target set of at least one layer associated with the target of the reference relationship;

determining a target layer stacking order for the target set of layers; and compositing the target set of layers according to the target layer stacking order to create the additional composite description.

51. The computer-readable medium of claim 48, wherein copying the target of the reference relationship includes copying the target of the reference relationship from a first portion of one of the layers to a second portion of the one of the layers.

52. The computer-readable medium of claim 45, further comprising:

instantiating the determinate component from the composite description.

53. The computer-readable medium of claim 52, wherein instantiating comprises:

determining if an active attribute of the determinate component in the composite description is true; and in response to a determination that the active attribute is true:

instantiating a data object corresponding with the determinate component; and initializing the data object according to the attribute values specified by the composite description.

54. The computer-readable medium of claim 52, wherein the determinate component is instantiated in a stage data structure of a digital production pipeline system.

55. The computer-readable medium of claim 54, wherein the stage data structure is adapted to be accessed by a pipeline application.

56. The computer-readable medium of claim 55, wherein the pipeline application is selected from a group consisting of a modeling application; a texturing application; a shading application; an articulation application; an animation application; a lighting application; a layout application; a simulation application; a rendering application; a spreadsheet application; a database application; and an application adapted to manipulate electronic documents.

* * * * *